(12) United States Patent
Teig et al.

(10) Patent No.: US 12,367,661 B1
(45) Date of Patent: Jul. 22, 2025

(54) WEIGHTED SELECTION OF INPUTS FOR TRAINING MACHINE-TRAINED NETWORK

(71) Applicant: Amazon Technologies, Inc., Seattle, WA (US)

(72) Inventors: Steven L. Teig, Menlo Park, CA (US); Eric A. Sather, Palo Alto, CA (US); Andrew F. Siegel, Shoreline, WA (US); Evgeny Sorkin, Vancouver (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 423 days.

(21) Appl. No.: 18/088,726

(22) Filed: Dec. 26, 2022

Related U.S. Application Data

(60) Provisional application No. 63/294,571, filed on Dec. 29, 2021.

(51) Int. Cl.
   *G06V 10/774*   (2022.01)
   *G06V 10/776*   (2022.01)

(52) U.S. Cl.
   CPC .......... *G06V 10/774* (2022.01); *G06V 10/776* (2022.01)

(58) Field of Classification Search
   CPC .... G06V 10/774; G06V 10/776; G06V 10/82; G06V 10/764; G06V 10/454; G06V 10/7715; G06V 10/762; G06V 10/7747; G06V 20/41; G06V 20/70; G06N 3/045; G06N 3/084; G06N 20/00; G06N 3/08; G06N 3/04; G06N 3/09; G06N 3/044; G06N 3/0464; G06N 3/047; G06N 3/096; G06N 7/01; G06N 20/20; G06N 3/048; G06N 3/082; G06N 3/063; G06N 3/088; G06F 18/214; G06F 17/18; G06F 18/2113; G06F 18/2148; G06F 18/2193; G06F 18/24; G06F 18/2415; G06F 18/2115
   See application file for complete search history.

(56) References Cited

U.S. PATENT DOCUMENTS

| | | | |
|---|---|---|---|
| 8,934,722 B2 * | 1/2015 | Peleg | G06F 18/41 382/224 |
| 10,019,654 B1 | 7/2018 | Pisoni | |
| 10,572,979 B2 | 2/2020 | Vogels et al. | |
| 10,579,907 B1 * | 3/2020 | Kim | G06N 3/045 |
| 10,970,441 B1 | 4/2021 | Zhang et al. | |
| 10,984,560 B1 | 4/2021 | Appalaraju et al. | |

(Continued)

OTHER PUBLICATIONS

Abolfazli, Mojtaba, et al., "Differential Description Length for Hyperparameter Selection in Machine Learning," May 22, 2019, 19 pages, arXiv:1902.04699, arXiv.org.

(Continued)

*Primary Examiner* — Michael S Osinski
(74) *Attorney, Agent, or Firm* — K&L Gates LLP

(57) ABSTRACT

Some embodiments provide a method for training a machine-trained network that includes multiple parameters. The method propagates a batch of input training items through the network to generate output values and compute values of a loss function for each of the input training items. The method computes a weight for each input training item based on the computed loss function values for each of the input training items. The method selects input training items with larger weights more often than input training items with smaller weights for subsequent batches of input training items.

20 Claims, 12 Drawing Sheets

(56) References Cited

U.S. PATENT DOCUMENTS

| | | | |
|---|---|---|---|
| 11,227,047 B1 | 1/2022 | Vashisht et al. | |
| 11,270,188 B2 | 3/2022 | Baker | |
| 11,531,879 B1 | 12/2022 | Teig et al. | |
| 11,568,179 B2* | 1/2023 | Posner | G06N 5/048 |
| 11,568,367 B2* | 1/2023 | Hajian | G06F 16/951 |
| 11,610,154 B1 | 3/2023 | Teig et al. | |
| 11,783,007 B2* | 10/2023 | Edridge | A63F 13/67 |
| | | | 463/31 |
| 12,045,723 B2* | 7/2024 | Cho | G06N 3/04 |
| 12,061,966 B2* | 8/2024 | Lapuschkin | G06N 3/02 |
| 12,165,017 B1* | 12/2024 | Grossman | G06F 17/17 |
| 2015/0340032 A1 | 11/2015 | Gruenstein | |
| 2017/0061326 A1 | 3/2017 | Talathi et al. | |
| 2017/0061625 A1 | 3/2017 | Estrada et al. | |
| 2017/0091615 A1 | 3/2017 | Liu et al. | |
| 2017/0206464 A1 | 7/2017 | Clayton et al. | |
| 2018/0068221 A1 | 3/2018 | Brennan et al. | |
| 2018/0101783 A1 | 4/2018 | Savkli | |
| 2018/0114113 A1 | 4/2018 | Ghahramani et al. | |
| 2018/0293713 A1 | 10/2018 | Vogels et al. | |
| 2019/0005358 A1 | 1/2019 | Pisoni | |
| 2019/0114544 A1 | 4/2019 | Sundaram et al. | |
| 2019/0138882 A1 | 5/2019 | Choi et al. | |
| 2019/0220741 A1 | 7/2019 | Garcia et al. | |
| 2019/0258935 A1* | 8/2019 | Umeda | G06N 3/084 |
| 2019/0286970 A1 | 9/2019 | Karaletsos et al. | |
| 2019/0340492 A1 | 11/2019 | Burger et al. | |
| 2020/0034751 A1 | 1/2020 | Kobayashi et al. | |
| 2020/0051550 A1 | 2/2020 | Baker | |
| 2020/0072610 A1 | 3/2020 | Hofmann et al. | |
| 2020/0134461 A1 | 4/2020 | Chai et al. | |
| 2020/0202213 A1 | 6/2020 | Rouhani et al. | |
| 2020/0234144 A1 | 7/2020 | Such et al. | |
| 2020/0285898 A1* | 9/2020 | Dong | G06N 3/08 |
| 2020/0285939 A1 | 9/2020 | Baker | |
| 2020/0311186 A1 | 10/2020 | Wang et al. | |
| 2020/0311207 A1 | 10/2020 | Kim et al. | |
| 2020/0334569 A1 | 10/2020 | Moghadam et al. | |
| 2020/0401929 A1* | 12/2020 | Duerig | G06N 5/02 |
| 2021/0056444 A1* | 2/2021 | Shimazu | G06N 20/00 |
| 2021/0142170 A1 | 5/2021 | Ozcan et al. | |
| 2021/0295205 A1* | 9/2021 | Ranco | G06F 17/16 |
| 2021/0342642 A1* | 11/2021 | Shabtay | G06F 18/2148 |
| 2021/0342688 A1* | 11/2021 | Wang | G06V 10/764 |
| 2022/0004921 A1* | 1/2022 | Balaraman | G06N 20/00 |
| 2022/0027536 A1* | 1/2022 | Dutta | G06N 20/00 |
| 2022/0092359 A1* | 3/2022 | Zhang | G06F 18/10 |
| 2022/0129760 A1* | 4/2022 | Ravikumar | G06F 21/6245 |
| 2022/0138564 A1* | 5/2022 | Da Costa | G06N 3/04 |
| | | | 706/25 |
| 2022/0156577 A1* | 5/2022 | Jha | G06N 3/08 |
| 2022/0208377 A1* | 6/2022 | Plummer | G16H 50/30 |
| 2022/0237449 A1* | 7/2022 | Chung | G06F 18/214 |
| 2022/0253647 A1* | 8/2022 | Perkins | G06N 20/20 |
| 2022/0292805 A1* | 9/2022 | Feng | G06V 20/41 |
| 2022/0301288 A1* | 9/2022 | Higuchi | G06N 3/047 |
| 2022/0366040 A1* | 11/2022 | Marbouti | G06N 3/045 |
| 2023/0017505 A1* | 1/2023 | Menon | G06F 18/2431 |
| 2023/0054130 A1* | 2/2023 | Wang | H04N 19/12 |
| 2023/0085127 A1* | 3/2023 | Byun | G06N 3/09 |
| | | | 382/157 |
| 2023/0098994 A1* | 3/2023 | Labatie | G06N 3/08 |
| | | | 706/25 |
| 2023/0116417 A1* | 4/2023 | Taccari | G06V 10/774 |
| | | | 706/15 |
| 2023/0120256 A1* | 4/2023 | Terjek | G06N 3/044 |
| | | | 706/15 |
| 2023/0162005 A1* | 5/2023 | Cheng | G06N 3/045 |
| | | | 706/15 |
| 2023/0194640 A1* | 6/2023 | Christodoulou | |
| | | | G01R 33/56545 |
| | | | 382/131 |
| 2023/0237333 A1* | 7/2023 | Shao | G06V 10/762 |
| | | | 706/25 |
| 2023/0385687 A1* | 11/2023 | Mahmood | G06F 18/2193 |
| 2023/0394807 A1* | 12/2023 | Sawada | G06N 3/096 |
| 2024/0241286 A1* | 7/2024 | Cha | G01V 20/00 |
| 2024/0370698 A1* | 11/2024 | Kosuge | G06N 3/04 |

OTHER PUBLICATIONS

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

Agostinelli, Forest, et al., "Learning Activation Functions to Improve Deep Neural Networks," Apr. 21, 2015, 9 pages, retrieved from https://arxiv.org/abs/1412.6830.

Author Unknown, "Renderman Support: Multi-Camera Rendering," Feb. 2007, 8 pages, Pixar Animation Studios.

Author Unknown, "Renderman Support: REYES Options," Month Unknown 2015, 42 pages, Pixar Animation Studios.

Author Unknown," 3.1. Cross-validation: evaluating estimator performance," SciKit-learn 0.20.3 documentation, Apr. 16, 2019, 15 pages, retrieved from https://web.archive.org/web/20190416122230/https://scikit-learn.org/stable/modules/cross_validation.html.

Babaeizadeh, Mohammad, et al., "NoiseOut: A Simple Way to Prune Neural Networks," Proceedings of the 29th Conference on Neural Information Processing Systems (NIPS 2016), Nov. 18, 2016, 5 pages, ACM, Barcelona, Spain.

Bagherinezhad, Hessam, et al., "LCNN: Look-up Based Convolutional Neural Network," Proceedings of 2017 IEEE Conference on Computer Vision and Pattern Recognition (CVPR 2017), Jul. 21-26, 2017, 10 pages, IEEE, Honolulu, HI, USA.

Castelli, Ilaria, et al., "Combination of Supervised and Unsupervised Learning for Training the Activation Functions of Neural Networks," Pattern Recognition Letters, Jun. 26, 2013, 14 pages, vol. 37, Elsevier B.V.

Chandra, Pravin, et al., "An Activation Function Adapting Training Algorithm for Sigmoidal Feedforward Networks," Neurocomputing, Jun. 25, 2004, 9 pages, vol. 61, Elsevier.

Cochrane, Courtney, "Time Series Nested Cross-Validation," Towards Data Science, May 18, 2018, 6 pages, retrieved from https://towardsdatascience.com/time-series-nested-cross-validation-76adba623eb9.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Duda, Jarek, "Asymmetric Numeral Systems: Entropy Coding Combining Speed of Huffman Coding with Compression Rate of Arithmetic Coding," Jan. 6, 2014, 24 pages, arXiv:1311.2540v2, Computer Research Repository (CoRR)—Cornell University, Ithaca, NY, USA.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Falkner, Stefan, et al., "BOHB: Robust and Efficient Hyperparameter Optimization at Scale," Proceedings of the 35th International Conference on Machine Learning, Jul. 10-15, 2018, 19 pages, Stockholm, Sweden.

Hansen, Katja, et al., "Assessment and Validation of Machine Learning Methods for Predicting Molecular Atomization Energies," Journal of Chemical Theory and Computation, Jul. 11, 2013, 16 pages, vol. 9, American Chemical Society.

Harmon, Mark, et al., "Activation Ensembles for Deep Neural Networks," Feb. 24, 2017, 9 pages, arXiv:1702.07790v1, Computing Research Repository (CoRR)—Cornell University, Ithaca, NY, USA.

He, Kaiming, et al., "Delving Deep into Rectifiers: Surpassing Human-Level Performance on ImageNet Classification," Proceedings of the 2015 IEEE International Conference on Computer Vision (ICCV), Dec. 7-13, 2015, 9 pages, IEEE, Washington, DC, USA.

(56) References Cited

OTHER PUBLICATIONS

Huynh, Thuan Q., et al., "Effective Neural Network Pruning Using Cross-Validation," Proceedings of International Joint Conference on Natural Networks, Jul. 31-Aug. 4, 2005, 6 pages, IEEE, Montreal, Canada.

Jain, Anil K., et al., "Artificial Neural Networks: A Tutorial," Computer, Mar. 1996, 14 pages, vol. 29, Issue 3, IEEE.

Kingma, Diederik P., et al., "Auto-Encoding Variational Bayes," May 1, 2014, 14 pages, arXiv:1312.6114v10, Computing Research Repository (CoRR)—Cornell University, Ithaca, NY, USA.

Kingma, Diederik P., et al., "Variational Dropout and the Local Reparameterization Trick," Proceedings of the 28th International Conference on Neural Information Processing Systems (NIPS '15), Dec. 7-12, 2015, 14 pages, MIT Press, Montreal, Canada.

Kumar, Ashish, et al., "Resource-efficient Machine Learning in 2 KB RAM for the Internet of Things," Proceedings of the 34th International Conference on Machine Learning, Aug. 6-11, 2017, 10 pages, vol. 70, PMLR, Sydney, Australia.

Leyton-Brown, Kevin, et al., "Auto-WEKA: Combined Selection and Hyperparameter Optimization of Classification Algorithms," Aug. 9, 2012, 12 pages, retrieved from https://arxiv.org/abs/1208.3719.

Li, Hong-Xing, et al., "Interpolation Functions of Feedforward Neural Networks," Computers & Mathematics with Applications, Dec. 2003, 14 pages, vol. 46, Issue 12, Elsevier Ltd.

Louizos, Christos, et al., "Bayesian Compression for Deep Learning," Proceedings of Advances in Neural Information Processing Systems 30 (NIPS 2017), Dec. 4-9, 2017, 17 pages, Neural Information Processing Systems Foundation, Inc., Long Beach, CA, USA.

M., Sanjay, "Why and how to Cross Validate a Model?," Towards Data Science, Nov. 12, 2018, 4 pages, retrieved from https://towardsdatascience.com/why-and-how-to-cross-validate-a-model-d6424b45261f.

Mackay, Matthew, et al., "Self-Tuning Networks: Bilevel Optimization of Hyperparameters Using Structured Best-Response Functions," Proceedings of Seventh International Conference on Learning Representations (ICLR '19), May 6-9, 2019, 25 pages, New Orleans, Louisiana.

Maclaurin, Dougal, et al., "Gradient-based Hyperparameter Optimization through Reversible Learning," Proceedings of the 32nd International Conference on Machine Learning, Jul. 7-19, 2015, 10 pages, JMLR, Lille, France.

Mitchell, Tom, "Artificial Neural Networks," Machine Learning—Chapter 4, Month Unknown 1997, 47 pages, McGraw Hill.

Molchanov, Dmitry, et al., "Variational Dropout Sparsifies Deep Neural Networks," Feb. 27, 2017, 10 pages, arXiv:1701.05369v2, Computing Research Repository (CoRR)—Cornell University, Ithaca, NY, USA.

Nair, Vinod, et al., "Rectified Linear Units Improve Restricted Boltzmann Machines," Proceedings of the 27th International Conference on Machine Learning, Jun. 21-24, 2010, 8 pages, Omnipress, Haifa, Israel.

Neklyudov, Kirill, et al., "Structured Bayesian Pruning via Log-Normal Multiplicative Noise, " Proceedings of the 31st Conference on Neural Information Processing Systems (NIPS 2017), Dec. 4-9, 2017, 10 pages, ACM, Long Beach, CA, USA.

Non-Published Commonly Owned Related U.S. Appl. No. 18/088,725 with similar specification, filed Dec. 26, 2022, 61 pages, Perceive Corporation.

Non-Published Commonly Owned Related U.S. Appl. No. 18/088,727 with similar specification, filed Dec. 26, 2022, 61 pages, Perceive Corporation.

Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.

Russell, Stuart, et al., "Artificial Intelligence: A Modern Approach," Second Edition, Month Unknown 2003, 145 pages, Prentice Hall, Inc.

Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.

Srivastava, Nitish, et al., "Dropout: A Simple Way to Prevent Neural Networks from Overfitting," Journal of Machine Learning Research, Jun. 2014, 30 pages, vol. 15, JMLR.org.

Srivastava, Rupesh Kumar, et al., "Highway Networks," Nov. 3, 2015, 6 pages, arXiv:1505.00387v2, Computer Research Repository (CoRR)—Cornell University, Ithaca, NY, USA.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Wen, Wei, et al., "Learning Structured Sparsity in Deep Neural Networks," Oct. 18, 2016, 10 pages, arXiv:1608.03665v4, Computer Research Repository (CoRR)—Cornell University, Ithaca, NY, USA.

Yang, Tien-Ju, et al., "Designing Energy-Efficient Convolutional Neural Networks using Energy-Aware Pruning," Apr. 18, 2017, 9 pages, arXiv:1611.05128v4, Computer Research Repository (CoRR)—Cornell University, Ithaca, NY, USA.

Zhang, Dongqing, et al., "LQ-Nets: Learned Quantization for Highly Accurate and Compact Deep Neural Networks," Jul. 26, 2018, 21 pages, arXiv:1807.10029v1, Computer Research Repository (CoRR)—Cornell University, Ithaca, NY, USA.

Zhang, Hongbo, "Artificial Neuron Network Hyperparameter Tuning by Evolutionary Algorithm and Pruning Technique," Month Unknown 2018, 8 pages.

Zhen, Hui-Ling, et al., "Nonlinear Collaborative Scheme for Deep Neural Networks," Nov. 4, 2018, 11 pages, retrieved from https://arxiv.org/abs/1811.01316.

Zhu, Chenzhuo, et al., "Trained Ternary Quantization," Dec. 4, 2016, 9 pages, arXiv:1612.01064v1, Computing Research Repository (CoRR)—Cornell University, Ithaca, NY, USA.

Zilly, Julian Georg, et al., "Recurrent Highway Networks," Jul. 4, 2017, 12 pages, arXiv:1607.03474v5, Computer Research Repository (CoRR)—Cornell University, Ithaca, NY, USA.

\* cited by examiner

WEIGHTED SELECTION OF INPUTS FOR TRAINING MACHINE-TRAINED NETWORK

BACKGROUND

Machine learning automates the creation, based on historical data, of models that can then be used to make predictions. A class of models called deep neural networks (or DNNs) has become popular over the last few years, and there is now a menagerie of types of DNNs. Some examples of DNN's include feed-forward, convolutional, recurrent, long-short term memory (LSTM), and Neural Turing Machines (NTM).

Neural networks typically involve many (e.g., thousands, millions, or even potentially billions) of weights that are optimized during training and then used when the neural network is embedded into a device. Given this, training a neural network can be an extremely resource-intensive process, requiring propagating many input items through the network and using the results to adjust the parameters. As such, techniques for optimizing the training process (e.g., to cause the parameters to converge to optimal values more quickly) are useful.

BRIEF SUMMARY

Some embodiments of the invention improve the selection of input training items for training a machine-trained network. After a batch of input training items has been propagated through the network, a training system computes a score for each of the input training items and uses this score to select the input training items for subsequent batches. In some embodiments, the score is based on gradients of a loss function with respect to time (during training) for each of the input training items. To best train the network in the shortest amount of time, some embodiments preferentially select input training items with higher scores more often than input training items with lower scores.

The training system of some embodiments propagates input training items ("inputs") through the network in batches and computes values of a loss function for each input in a batch by comparing an expected (ground-truth) output value (or set of output values) for the input to an actual output for the generated by propagating the input through the network. Some embodiments use a loss function that measures "unhappiness", which is an expression of the distance between the expected output and the actual generated output. For instance, a loss function for a network that classifies each input (e.g., images) into one of a group of classifications typically produces as output values a set of probabilities for each classification. The loss function then measures a distance (e.g., using cross-entropy or another measure) between the ground-truth output probabilities and the generated output probabilities for each input. After computing the loss function for each input in a batch, the training system back-propagates the inputs by computing the gradient of the loss function with respect to each parameter of the network in order to modify the parameters.

Each batch of inputs is selected from a larger group of available training inputs. In some embodiments, either after each batch of inputs has been propagated and back-propagated or after a set of such batches, the training system calculates scores for the available training inputs and uses these scores to select inputs for the subsequent batches. In some embodiments, the score for each input is a ratio of (i) the value of the loss function for the input to (ii) the gradient of the loss function with respect to time for the input. This score is proportional to the loss function for the input (i.e., the distance from the generated output value for the input to the expected output value), and thus will be higher for input training items that the network is having more trouble with. However, the score is inversely proportional to the gradient of the loss function for the input, because a higher gradient indicates that the network is converging more quickly for that input and therefore the network should (at least potentially) provide an accurate result for the input more quickly. Thus, the score is an estimate of the "time to happiness" for the individual input; that is, the amount of further training required for the network to provide an output value matching the expected output value for the input.

In some embodiments, the training system uses a graphics processing unit (GPU) or set of GPUs to perform the forward and/or back-propagation, and thus compute the gradients. However, the GPU uses gradients for a batch of inputs and thus, even if the gradients for individual inputs are calculated, these individual gradients may not be available for the score calculations. Thus, the training system of some embodiments estimates these gradients based on how the loss function for an individual input has changed over a set of prior training batches. The training system stores a number of these past loss function values for the individual input and estimates the gradient using, e.g., a linear regression of the past loss function values.

For subsequent batches of inputs, the training system of some embodiments uses the score for the various individual inputs in order to select the inputs for a batch from the larger group of available inputs. In some embodiments, training inputs with larger scores are given larger weights for a selection algorithm and thus are more likely to be selected. For example, some embodiments use a function that assigns probabilities directly (e.g., linearly) proportional to the score for an input and then selects based on these probabilities. Other embodiments may use more complicated formulations or divide the inputs into clusters based on the scores and then select inputs from the different clusters. Some embodiments only allow an individual input to be selected once per batch, but the inputs with higher scores will be selected for a larger number of batches. In addition, some embodiments require that over a number of batches each individual input is selected at least once so that the network is not modified in such a way as to no longer provide a good result for an input that previously had contributed minimally to the loss function.

In addition to using scores to select training inputs for batches of inputs during training that modifies the network parameters, some embodiments also use a similar scoring methodology to select training inputs for the set of available inputs. Some embodiments divide all potential inputs into a training set that is used for training the network parameters as described above and a validation set that is used for verifying the network as trained. Key to this process is that the validation set only includes inputs that have not been used at any point to train the network (i.e., from the perspective of the trained network these inputs are completely new when used for verification of the network). This enables the testing (validation) of the network using entirely new inputs. After each iteration of network validation, a portion of the validation inputs are added to the training set (and thus removed from the validation set for any further validation) in a rigorous manner.

In addition, each time the network is tested, the validation inputs can be used to tune various hyperparameters. These hyperparameters are not actual parameters of the network but instead define various aspects of how the network is trained (e.g., loss function coefficients, a learning rate that specifies how aggressively the network parameters are modified based on the gradients, etc.). To better tune the hyperparameters, some embodiments attempt to minimize a description length score that specifies a description length of the network. However, rather than computing a description length based on, e.g., a number of bits required to describe the trained network (i.e., to describe the parameters of the trained network), the description length score of some embodiments specifies a measure of the number of bits required to reconstruct the trained network through the hyperparameter tuning technique. The optimization algorithm for the description length score thus seeks to minimize the sum of (i) the bits required to specify the correct output value for each new training input and (ii) the bits required to update the hyperparameters at each iteration. In general, the smaller the loss function value for a given validation input, the smaller the number of bits that are required to specify the correct output value for that input.

Some embodiments also use this error bit calculation (or a different measure of calculating a loss score) for each validation set input to determine which inputs to transfer to the training set. For instance, some embodiments transfer validation set inputs with the highest associated loss to the training set (so that subsequent training can use the validation set inputs that the network has the hardest time with). Specifically, some embodiments transfer a number of these validation set inputs to the training set until the cumulative error bits associated with the transferred inputs reaches a threshold.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention improve the selection of input training items for training a machine-trained network. After a batch of input training items has been propagated through the network, a training system computes a score for each of the input training items and uses this score to select the input training items for subsequent batches. In some embodiments, the score is based on gradients of a loss function with respect to time (during training) for each of the input training items. To best train the network in the shortest amount of time, some embodiments preferentially select input training items with higher scores more often than input training items with lower scores.

Figure 1:
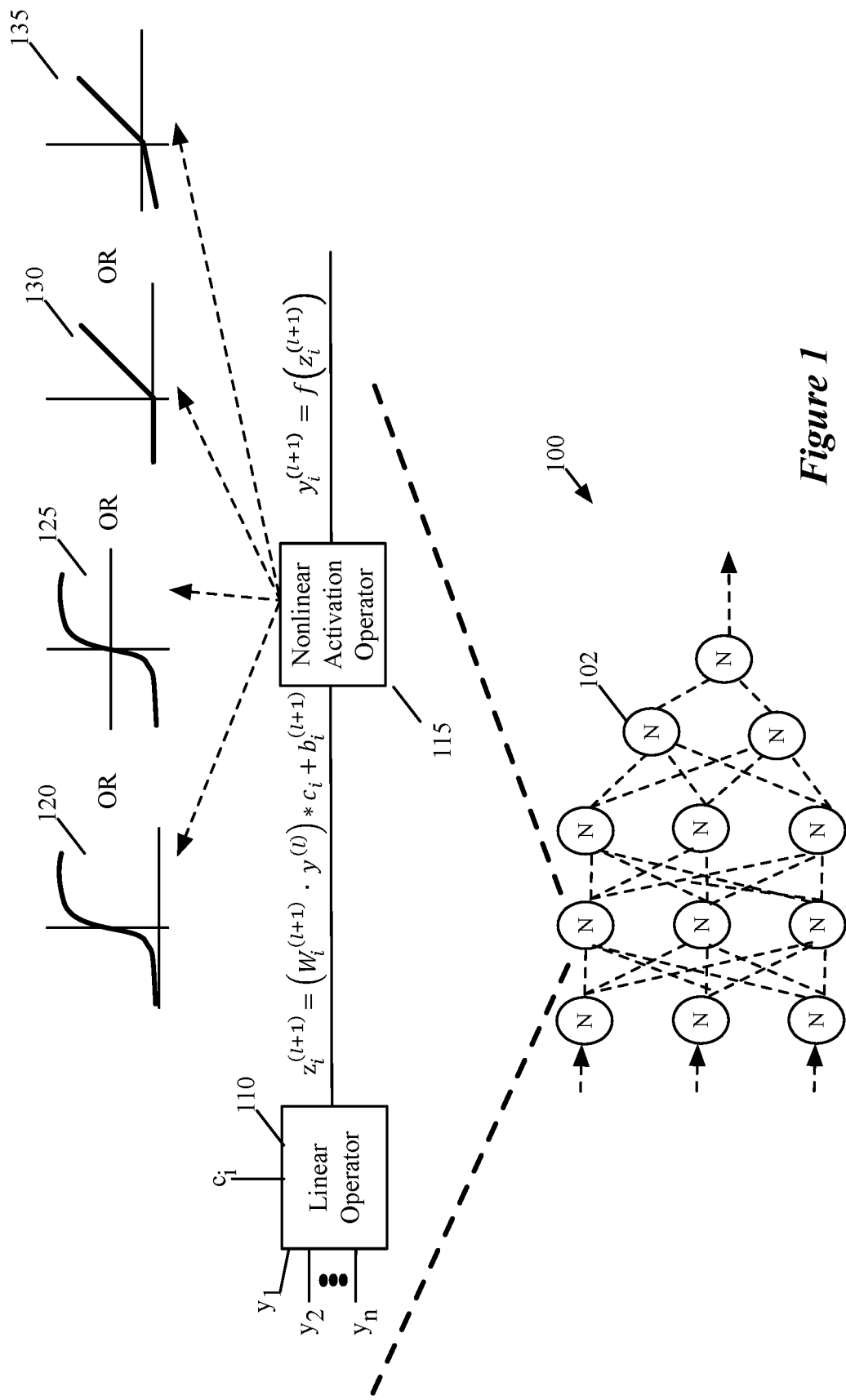
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 10-dimensional vector representing probabilities for each of a set of categories), or an individual value representing one of a predefined set of categories.

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, as mentioned, the neural networks of some embodiments are convolutional feed-forward neural networks. In this case, the intermediate layers (referred to as "hidden" layers) may include convolutional layers, pooling layers, element-wise operation layers, fully-connected layers, and/or normalization layers. The convolutional layers of some embodiments use a small kernel (e.g., 2×2, 3×3, 5×5, etc.) to process blocks of input values (output values from a previous layer) in a set of two-dimensional grids (e.g., channels of pixels of an image, input feature maps) with the same set of parameters. The kernels (also referred to as filters) are three-dimensional, and multiple kernels are used to process each group of input values in a layer (resulting in a set of three-dimensional output grids, also referred to as output feature maps). Pooling layers combine clusters of outputs from one layer into a single node at the next layer, as part of the process of reducing an image (which may have a large number of pixels) or other input item down to a smaller size (e.g., a vector output). In some embodiments, pooling layers can use max pooling (in which the maximum value among the clusters of node outputs is selected) or average pooling (in which the clusters of node outputs are averaged).

Figure 2:
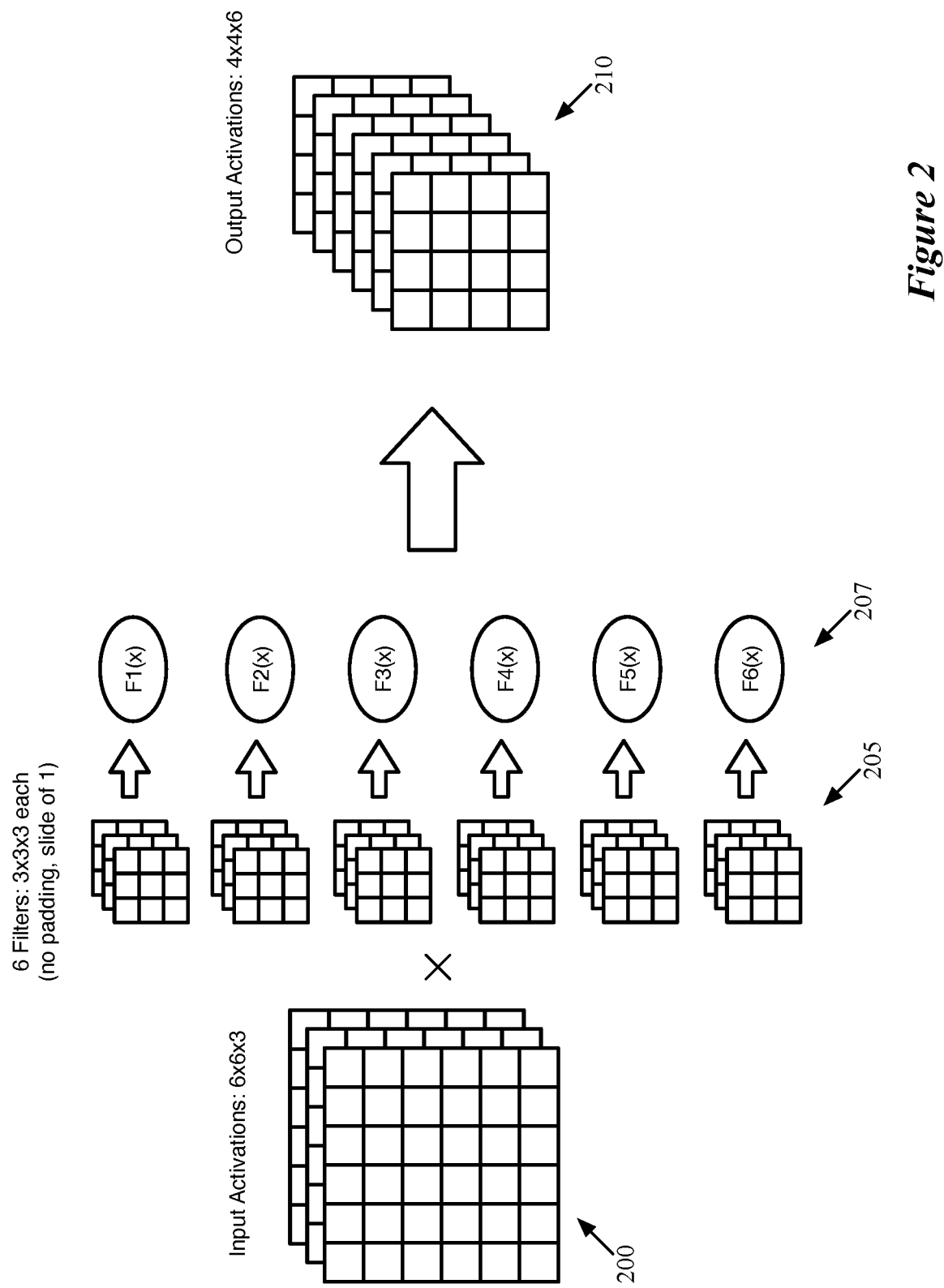
FIG. 2 conceptually illustrates a representation of a convolutional layer of a convolutional neural network.

FIG. 2 conceptually illustrates a representation of a convolutional layer of a convolutional neural network. The convolutional layer receives a set of input activation values 200 organized as a three-dimensional array. This three-dimensional array is typically either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, also referred to as input feature maps or input channels for the layer, as shown in the figure. In this example, the dimensions of the input values are 6×6×3 (i.e., three 6×6 input channels).

Each computation node of the convolutional layer involves a linear component (e.g., a dot product followed by scaling and bias functions) as well as a non-linear component, as further described below. The input to each computation node is a subset of the input activation values, and the dot product for the computation node involves multiplying those input activation values by the weights that make up one of the filters of the layer. As shown, in this example the layer includes six filters 205, each of which is 3×3×3. Each value in one of the filters is a weight value that is trained using the techniques described herein. Thus, in the example shown in this figure, each filter includes 27 trainable weight values.

The size of the filters in the x and y directions can vary (3×3 and 5×5 are common sizes), but in some embodiments the depth is required to match the depth of the input activations (in this case there are three input feature maps, or channels, so the depth of the filters is three). The number of filters in a given layer can also vary—in general, each filter is attempting to identify the presence or extent of a particular feature in the input values. For instance, in image analysis, a filter in an early layer might test for the presence of an edge in a particular direction while a filter in a later layer tests for the presence of a more specific object type in the image (e.g., a nose).

To generate the output activations, each of the filters 205 is applied to numerous subsets of the input activation values 200. Specifically, in a typical convolutional layer, each 3×3×3 filter is moved across the three-dimensional array of activation values, and the dot product between the 27 activations in the current subset and the 27 weight values in the filter is computed. This process starts in the top left corner (e.g., x=0-2, y=0-2) of the grid, and includes the full depth of the array. The filter moves across the rows, in this case using a slide of 1 (i.e., moving one column per computation node, such that the second dot product uses activations at x=1-3, y=0-2). When the end of a row is reached, the filter is moved back to the first columns (i.e., x=0-2) and down one row (i.e., y=1-3), and so on until the bottom right corner of the array is reached. Though not the case in this example, some embodiments use zero-padding at the edges of the grids (e.g., to allow for better detection of features at the edges of images).

Each computation node, in some embodiments, involves this dot product as well as the subsequent operations to generate the output activation values. The linear component includes any scale and/or bias calculations, and the non-linear component involves applying an activation function to the output of the linear component. As shown in the figure, each filter 205 has an associated activation function 207. In some embodiments, the activation function associated with a particular filter is the function applied to the output of the linear component of each computation node that uses that particular filter. Different embodiments may use the same activation function for all filters of a layer (and therefore all nodes in the layer), or have different activation functions associated with different filters (e.g., different types of activation functions or activation functions of the same type but with different parameters). The parameters of these activation functions 207 are also trained like the weight parameters in some embodiments.

The output activation values 210 are arranged in a 4×4×6 array in this example. The outputs from a single filter are arranged in a single grid (also referred to as an output feature map or output channel), and because the example has six filters 205, the output activations have six output feature maps. Using a slide value of 1 with no zero-padding results in a 4×4 output feature map for each filter. These output activation values 210 are then the input activation values for the next layer of the neural network.

As shown in FIG. 1, each node in the neural network 100 has a linear component 110 and a nonlinear component 115. The linear component 110 of each hidden or output node in this example computes a dot product of a vector of weight coefficients and a vector of output values of prior nodes (i.e., as described above for convolutional layers), multiplies this by a scaling value (which may be set to 1), and adds an offset. In other words, in a convolutional or fully-connected layer, a node's linear operator computes a scaled weighted sum of its inputs (which are outputs of the previous layer of nodes) plus an offset (also referred to as a bias). Similarly, the linear component 110 of each input node of some embodiments computes a dot product of a vector of weight coefficients and a vector of input values, scales this dot product, and adds an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable $l$ can be any of the hidden layers (i.e., $l \in \{1, \ldots, L-1\}$ index the hidden layers of the network, with $l=0$ representing the input layer and $l=L$ representing the output layer). The variable $z_i^{(l+1)}$ represents the output of the linear component 110 of a hidden node i in layer l+1. As indicated by the following Equation (1), the variable $z_i^{(l+1)}$ is computed as the dot product of a vector of weight values $W_i^{(l+1)}$ and a vector of outputs $y^{(l)}$ from layer/multiplied by a scaling value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n}\left(w_{ik}^{(l+1)} * y_k^{(l)}\right) * c_i + b_i^{(l+1)}. \quad (1)$$

The scaling value $c_i$ is a value to which all the weight values for the node are normalized. In some embodiments, the scaling value $c_i$ is 1. The symbol * is an element-wise product, while the symbol · is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments require that at least a threshold percentage of the weight values (for a given layer or for the entire network) are equal to zero (e.g., 75%, 80%, etc.).

The output $y_i^{(l+1)}$ of the nonlinear component 115 of a node in layer l+1 is a function of the node's linear component, and can be expressed as by Equation (2) below:

$$y_i^{(l+1)} = f(z_i^{(l+1)}). \quad (2)$$

In this equation, $f$ is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv: 1502.01852, 2015. In some embodiments, the activation functions can be other types of functions, like cup functions, periodic functions, piecewise linear functions, etc.

Equation (2) can be expressed in the following expanded format of Equation (3):

$$y_i^{(l+1)} = f(z_i^{(l+1)}) = f\left[\left(\sum_{k=1}^{n}w_{ik} * y_k\right) * c_i + b_i^{(l+1)}\right]. \quad (3)$$

In this equation, $w_{ik}$ are weight values associated with the inputs $y_k$ of the node i in layer l+1.

Before a multi-layer network (e.g., a convolutional neural network) can be used to solve a particular problem, the network is put through a supervised training process that adjusts the network's configurable parameters (e.g., the weight values, biases, etc.). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values). In addition, some embodiments quantize the network by constraining the weight values to sets of allowed values and/or accounting for quantization of output values to a certain number of bits. Some such embodiments use the alternating direction method of multipliers (ADMM) to handle this quantization of the weight values (which includes performing forward and backward propagation), and ensure that at least a threshold percentage of the weight values are set to zero.

In some embodiments, at the end of the training of the network, each of the weights is restricted to a set of allowed quantized weight values (e.g., the set {0,1,−1} or {0, $\alpha_k$, $-\alpha_k$}, where $\alpha_k$ is a scale value that varies for different layers or filters). In addition, in some embodiments, the training is further complicated in that the output values of each layer are quantized (e.g., to a particular number of bits). The combination of (i) weight quantization (e.g., ternarization), (ii) weight sparsity (ensuring that a threshold of the weight values are equal to zero), and (iii) output value quantization allows for the network to be implemented by a specialized neural network inference circuit of some embodiments that puts restrictions on the weight and intermediate layer output value sizes in the interest of power and memory savings.

Figure 3:
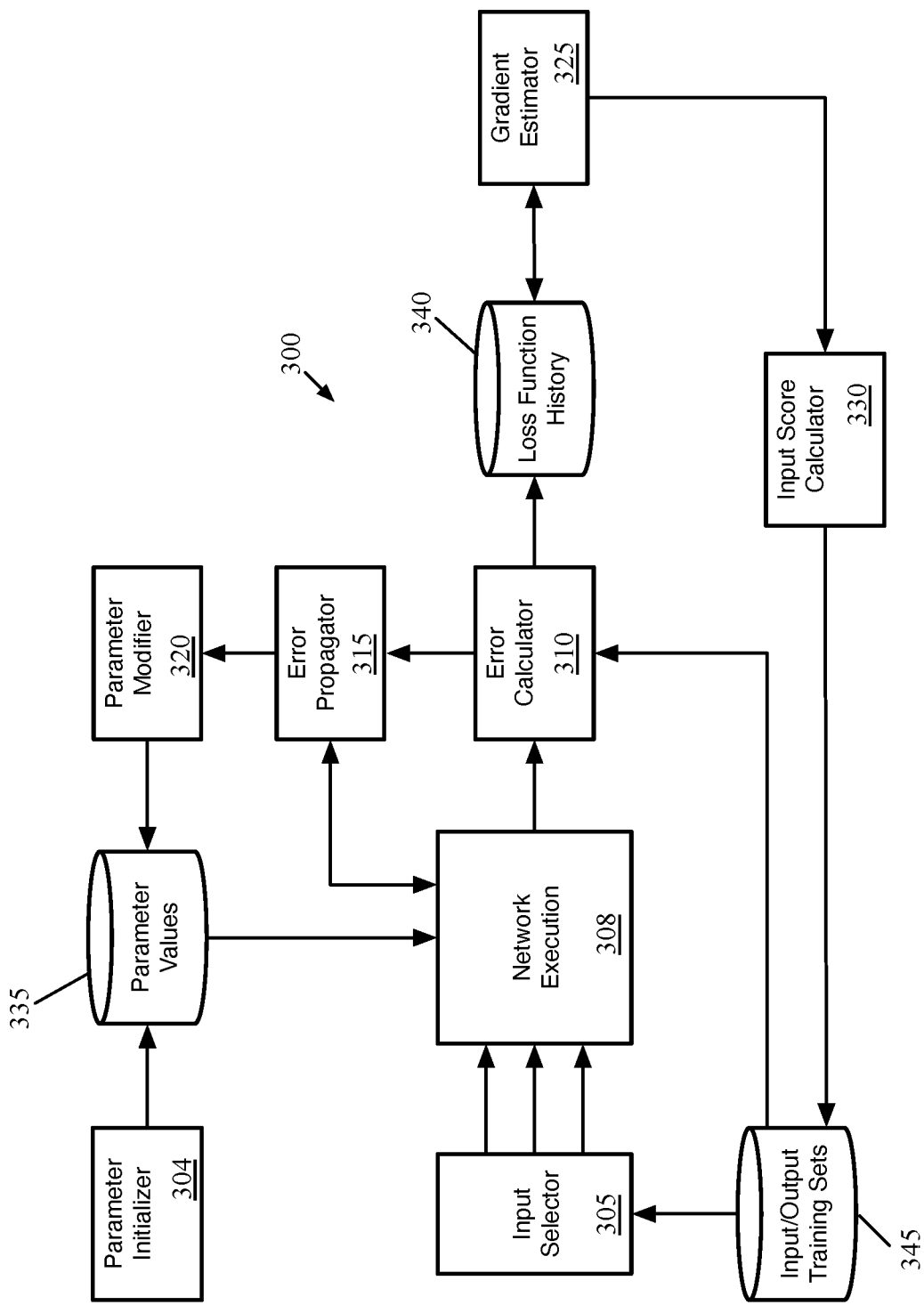
FIG. 3 conceptually illustrates a training system of some embodiments that trains the weight values (and other parameters) of a neural network.

FIG. 3 conceptually illustrates a training system 300 of some embodiments that trains the weight values (and other parameters) of a neural network. The training system 300 may train floating-point weight values, quantized weight values, and/or other types of parameters (e.g., biases, activation function parameters, etc.). The training system uses a score-based remassing system that, after an initial set of training batches, preferentially selects input training items with which the network has more trouble (i.e., for which the network generates outputs that are further from the expected ground-truth outputs).

As shown, the training system 300 has a number of modules, including a parameter initializer 304, an input selector 305, a network execution module 308, an error calculator 310, an error propagator 315, a parameter modifier 320, a gradient estimator 325, and an input score calculator 330, all of which will be described in further detail below. In some embodiments, all of these modules execute on a single device, such as a server, a desktop or laptop computer, a mobile device (e.g., a smartphone, tablet, etc.), a virtual machine, etc. In other embodiments, these modules may execute across multiple interconnected devices (or virtual machines, containers, etc.), or separate instances may execute on multiple devices (or virtual machines, containers, etc.) for additional computing power.

The parameter initializer 304 takes as input the network structure and generates initial (typically random) parameter values. In some embodiments, the neural network weights are floating-point weight values restricted to values ranging from −1 to 1, while other embodiments do not restrict the weight values at all. The initial weight values and other parameters (e.g., biases) are stored in a parameter storage 335. In some embodiments, the parameter storage 335 stores the most recent set of trained parameters, which change throughout training. Other embodiments store a history of the sets of parameter values for the network, which allows review of how parameters may have changed throughout the training.

The network execution module 308 of some embodiments handles the actual execution of the network (forward propagation of an input) during training. It should be noted that while many training systems use stochastic gradient descent (SGD) training, many of the principles described herein regarding input selection are not limited to SGD training. The network execution module 308 applies the network structure using the current stored parameters 335 to a set of inputs in order to propagate these inputs through the network and generate corresponding outputs.

During forward propagation, the input selector 305 selects which inputs from the input/output sets 345 to propagate together through the network for a batch of inputs in a single training iteration (often referred to as a minibatch). The input selector 305, as described below, selects the inputs for a batch based on scores calculated for each of the inputs that are indicative of a time that will be needed for the network to converge to providing an accurate output for the input. In some embodiments, the input selector 305 also prepares these inputs for propagation through the network so that the network execution module 308 can generate output values for the inputs. In some embodiments, there are two levels of input selection. First, a group of inputs is selected from the entire training set to be used as the training inputs for an epoch (e.g., using the calculated scores for the inputs). Second, for each batch within that epoch, a subset of inputs is selected from the previously-selected set (e.g., using stratified sampling, as described below).

The input/output sets 345 include various inputs to the network as well as the corresponding expected (ground truth) outputs for each of the inputs. Some embodiments perform training with a large number of different inputs, as this can help train the weight values for an average input. Each input in an input set may be an image, a voice snippet, etc. that is to be propagated through the network, depending on the specific purpose for which the network is being trained. For example, if a network is being trained to identify faces, the set of inputs will include numerous images of several different people's faces, probably including various types of edge cases (e.g., images where the face is distorted, where objects partially appear in front of the face, etc.). Each input also has a corresponding expected (ground truth) output that is what the network should generate as its output when presented with that input.

The error calculator 310 compares the generated output values to expected (ground truth) output values using a loss function, which also may incorporate various regularization terms, Lagrangian terms, etc. that bias the training in certain ways (e.g., to push weight values towards specific ternary values). Some embodiments use a loss function that measures "unhappiness", which is an expression of the distance between the expected output and the actual generated output. For instance, a loss function for a network that classifies each input (e.g., images) into one of a group of classifications typically produces as output values a set of probabilities for each classification. The loss function then measures, for each input, a distance (e.g., using cross-entropy or another measure) between the ground-truth output probabilities stored with the input/output sets 345 and the output probabilities for each input generated by the network execution module 308.

The error propagator 315 also back-propagates the computed error for a batch of inputs to determine the rate of change (gradient) of the loss function with respect to a change in each of the network parameters being trained at the current value of the loss function. The parameter modifier 320 uses these network parameter gradients to modify the parameter values 335 for the next training iteration. Some embodiments use SGD training to modify the parameter values. The process of input selection, forward propagation, loss function calculation, and back-propagation is repeated for multiple batches of inputs 345 in some embodiments.

As mentioned, the input selector 305 selects each batch of inputs from the larger group of available training inputs 345. In some embodiments, the input selector 305 uses scores that have been calculated for each of the inputs 345 in order to select the inputs for a batch. These scores are calculated by the input score calculator 330. While different embodiments may use different specific methods to compute these scores, the score generally will be higher for inputs for which the network is further from generating a correct output (i.e., for which the loss function value is higher).

In some embodiments, inputs 345 with larger scores are given larger weights for a selection algorithm and thus are more likely to be selected for subsequent batches by the input selector 305. For example, some embodiments use a function that assigns probabilities directly (e.g., linearly) proportional to the score for an input and then the input selector 305 selects inputs for a batch based on these probabilities. Other embodiments may use more complicated formulations or divide the inputs into clusters based on the scores and then select inputs from the different clusters. Some embodiments only allow an individual input to be selected once per batch, but the inputs with higher scores will be selected for a larger number of batches. In addition, some embodiments require that over a number of batches each individual input is selected at least once so that the network is not modified in such a way as to no longer provide a good result for an input that previously had contributed minimally to the loss function.

In some embodiments, either after each batch of inputs has been propagated and back-propagated or after a set of such batches, the input score calculator 330 calculates the scores for the training inputs 345 so that the input selector 305 can use these scores to select inputs for the subsequent batches. In some embodiments, the input score calculator 330 uses as a formula, for each input, the ratio of (i) the most recent value of the loss function for the input to (ii) the gradient of the loss function with respect to training time for the input. This score, as mentioned, is proportional to the loss function for the input (i.e., the distance from the generated output value for the input to the expected output value), and thus will be higher for input training items that the network is having more trouble with. However, the score is inversely proportional to the gradient of the loss function for the input, because a higher gradient indicates that the network is converging more quickly for that input and therefore the network should (at least potentially) provide an accurate result for the input more quickly. Thus, the score is an estimate of the "time to happiness" for the individual input; that is, the amount of further training required for the network to provide an output value matching the expected output value for the input.

However, in some embodiments, the training system 300 uses a graphics processing unit (GPU) or set of GPUs to perform the forward and/or back-propagation, and thus to compute the gradients. In many cases, GPUs use gradients for a batch of inputs and thus, even if the gradients for individual inputs are calculated, these individual gradients may not be available to the input score calculator 330. Thus, a gradient estimator 325 estimates these gradients in some embodiments based on how the loss function for an individual input has changed over a set of prior training batches.

The error calculator 310, in addition to providing the loss function values for each input propagated through the network in a minibatch, stores these loss function values in a loss function history storage 340. This loss function history 340 stores the values of the loss function for each available input 345. Some embodiments store the entire history for each input (e.g., a batch identifier for each time the input was used and the loss function value indicating how far the network was from accurately predicting the output for that input). Other embodiments only store this information for up to a pre-specified number of the most recent times the input was selected and propagated through the network. The gradient estimator 325 estimates the gradient for each input using, e.g., a linear regression of the past loss function values (e.g., the past five values, past ten values, etc.).

Figure 4:
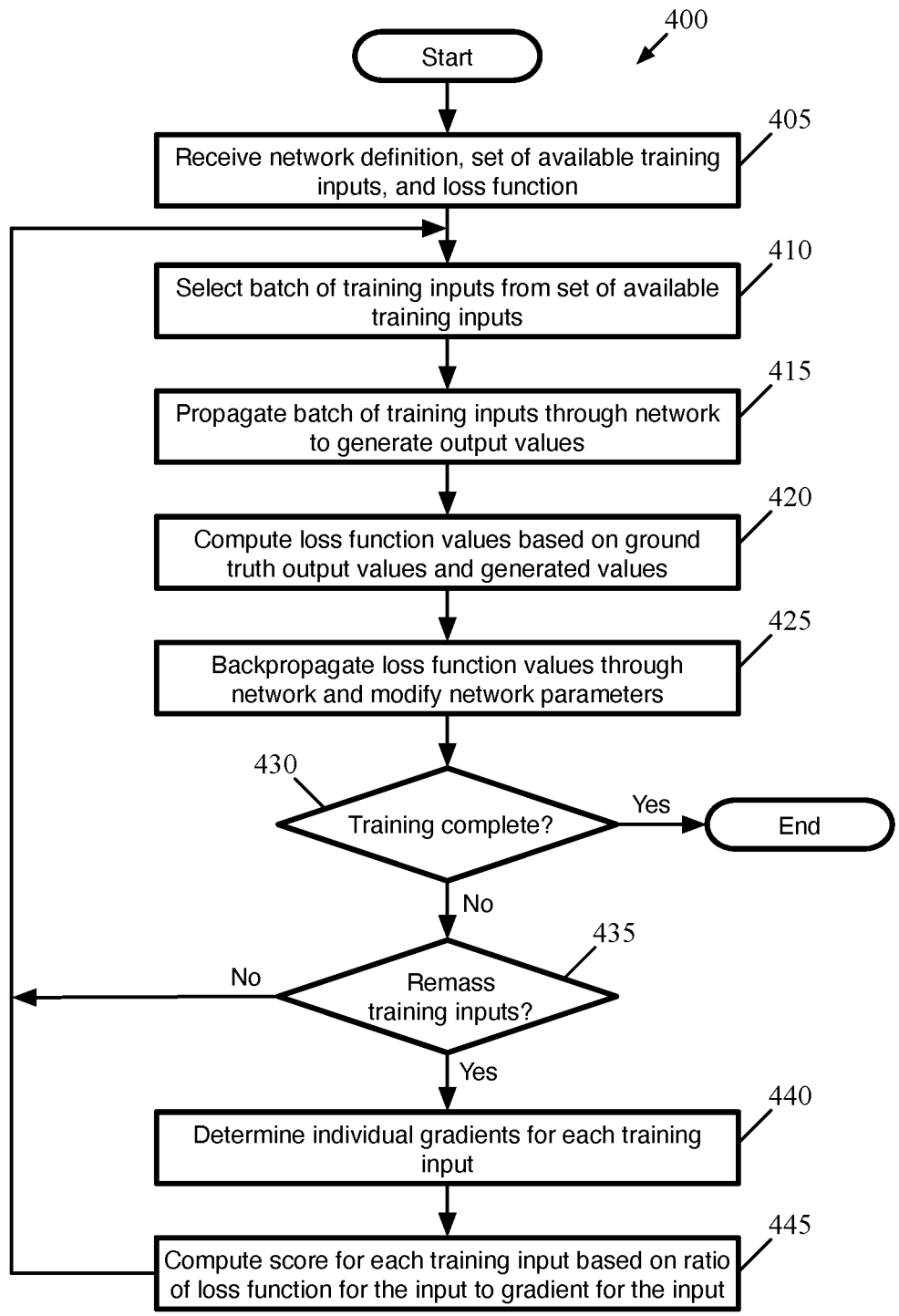
FIG. 4 conceptually illustrates a process of some embodiments for training a machine-trained network (e.g., a neural network).

FIG. 4 conceptually illustrates a process 400 of some embodiments for training a machine-trained network (e.g., a neural network). The process 400 is performed, in some embodiments, by a training system such as that shown in FIG. 3. It should be noted that, the process 400 conceptually indicates the process performed for one iteration (e.g., one epoch) of training a network. In some embodiments, various aspects of the training (e.g., hyperparameters) will be adjusted and subsequently another iteration of the process 400 is run.

As shown, the process 400 begins by receiving (at 405) a network definition, a set of available inputs, and a loss function. The network, in different embodiments, may be a feed-forward network (e.g., a fully-connected or convolutional network), a recurrent network, a regulatory feedback network, a radial basis function network, etc. The network definition specifies the structure of the network, including the number, type, and size of the layers, the number and structure of filters for each convolutional or fully-connected layer, etc. The network definition may also specify initialized values for all of the trainable network parameters (e.g., weights, biases, activation function parameters, etc.), and often varies based on the purpose for which the network will be trained. For instance, a network that classifies an image into one of a set of (e.g., 10) categories will have a different output format (a set of probabilities for each of the categories) than a network that specifies whether or not a face is present or a network that identifies bounding boxes for each face in an image.

The set of available inputs (as well as ground truth outputs) depends on the purpose of the network. For instance, image analysis networks will have a variety of different images as inputs, typically aiming for at least some edge cases of various types. For a categorization network, the set of available inputs will often include not only various canonical examples of each category but also images of one category that could easily be mistaken for another category (e.g., an image of a small dog with cat-like features), images that place the item to be categorized on the edge or in the corner, etc.

The loss function used will often depend on the type of output being generated by the network as well as additional factors that may be accounted for in training. For instance, in addition to measuring how far apart the generated output is from the ground truth output, loss functions may include regularization terms as well as penalty terms for parameters that push the parameters towards certain values (e.g., when training a sparse ternary network in which all weights are required to be one of three allowed values for the weight and a particular percentage of the weights are required to be set to zero). For a categorization network, one example of a loss function L(d), for an input (data sample) d is given by:

$$L(d) = -\Sigma_{c \neq k} p_c(d) \log(1 - p_c(d)) - (1 - p_k(d)) \log p_k(d). \quad (4)$$

Here, k is the correct category c for the input, while $p_c$ represents the probability output by the network for each category. An alternative loss function for such a network is given by:

$$L(d) = -\sum_{c \neq k} \frac{p_c(d)}{1 - p_k} \log(1 - p_c(d)) - \log p_k(d). \quad (5)$$

This second loss function includes a common cross-entropy term as well as a term that penalizes off-diagonal mispredictions.

Next, the process 400 selects (at 410) a batch of training inputs from the set of available training inputs. In some embodiments, during the initial iterations (prior to any remassing of the inputs) each of the inputs is selected with an equal probability. For instance, if there are 100 available training inputs and 25 inputs in each batch, then each input will be selected on average every fourth batch. Some embodiments also require that each input only be selected once per batch (i.e., no input should be included multiple times in a batch).

Figure 5:
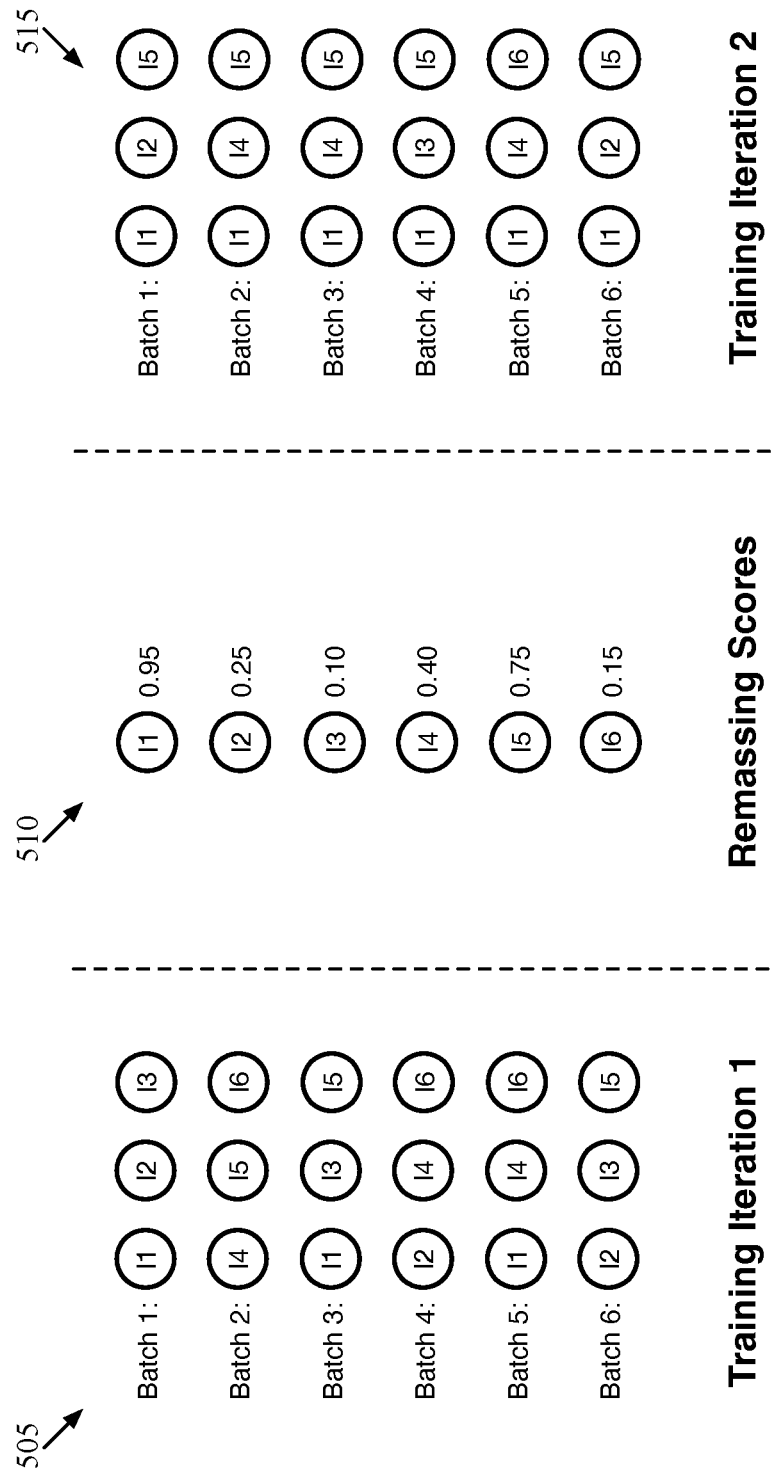
FIG. 5 conceptually illustrates selection of inputs for batches in two different training iterations.

FIG. 5 conceptually illustrates selection of inputs for batches in two different training iterations. In this simplistic example, there are six available training inputs I1-I6, and each batch has three inputs. It should be understood that a typical training system will have both a larger pool of available inputs (e.g., hundreds or thousands of such inputs) as well as a larger number of inputs per minibatch.

In the first training iteration 505, each of the six inputs has the same probability of being selected and therefore each input is selected three times over the six batches. The first batch uses inputs I1, I2, and I3; the second batch uses inputs I4, I5, and I6; the third batch uses inputs I1, I3, and I5; the fourth batch uses inputs I2, I4, and I6; the fifth batch uses inputs I1, I4, and I6; and finally, the sixth batch uses inputs I2, I3, and I5. It should be noted that in this example none of the batches are the same group of inputs. Some embodiments require that the batches in a training iteration use different combinations of inputs (e.g., as opposed to repeating the first two batches several times).

As described above, for subsequent iterations, some embodiments use scores that are calculated based on the loss function for the inputs or a ratio of the loss function to the gradient for the input. FIG. 5 also shows the remassing scores 510 calculated after the first training iteration. The remassing scores 510 in this case are 0.95 for I1, 0.25 for I2, 0.10 for I3, 0.40 for I4, 0.75 for I5, and 0.15 for I6. That is, I1 has the highest score (i.e., is expected to take the longest training time for the network to output the correct value for I1) while I3 has the lowest score. As such, going forward the process 400 should select I1 the most often and I3 the least often.

It should be noted that these scores are not normalized and therefore do not represent the probability that each input will be selected. Some embodiments do, however, normalize these scores to probabilities based on the scores, the number of inputs, and the number of batches in an iteration. For a simplistic example, if an iteration only included one batch of six inputs and there were six inputs available, then all of the inputs would have a selection probability of 1 (assuming a rule that limits each input to being selected at most once per batch). In this case, three inputs are selected per batch and there are six batches per iteration, so the normalized selection probabilities should add up to three, in increments of 1/6.

In the second training iteration 515, the six inputs are selected different numbers of times over the six batches. I1 has a very high score (relative to the other inputs) and is therefore selected for each of the batches. I5 also has a high score, and is selected for five of the six batches. Each of I3 and I6, the inputs with the lowest scores, are only selected for one batch. I4 is selected for three of the batches, while I2 is selected for two of the batches. Thus, the subsequent back-propagation and parameter modification will account for I1 more often than any of the other inputs, and hopefully modify the parameters in such a way that the network will provide more accurate outputs for those inputs. It should be noted that, in this simplistic example, the number of available training inputs is larger than the number of inputs selected over each training iteration. In other embodiments, the number of available inputs is larger such that some inputs may not be selected at all during a given training iteration.

Returning to FIG. 4, after selecting the inputs, the process 400 propagates (at 415) the selected batch of training inputs through the network to generate output values. Some embodiments propagate each individual input through the entire network separately. Other embodiments actually perform the propagation in layers (e.g., propagating all of the inputs in a batch through the first layer of the network, then propagating all of these separate layer outputs through the second layer, etc.). This latter methodology enables easier computation of batch normalization parameters on a layer by layer basis.

The process 400 then computes (at 420) loss function values based on the ground truth output values for each of the selected inputs and the output values generated by the network for each of the selected inputs. As described above, different loss functions may be used depending on the type of output being generated as well as other factors, including the use of various types of regularization and/or penalty terms. Examples of such loss function terms can be found in U.S. Pat. No. 11,113,603, as well as U.S. patent application Ser. Nos. 15/921,622, 16/923,003, 17/089,653, and U.S. Provisional Patent Application 63/189,516, all of which are incorporated herein by reference. Finally, for the current batch, the process 400 backpropagates (at 425) the loss function values through the network (to determine gradients for each network parameter) and modifies the network parameter (based on the gradients).

With the current batch complete (i.e., forward propagation and back-propagation finished for the batch), the process 400 determines (at 430) whether the current training is complete. As described above, the process 400 might be run multiple times for different training epochs (e.g., with hyperparameter adjustment, a projection step of ADMM, or other operations performed between epochs). If the training is complete, the process 400 ends.

Otherwise, the process 400 determines (at 435) whether to remass the training inputs. That is, the process 400 determines whether to compute new scores for each of the training inputs based on the results of the most recent batches of inputs. In some embodiments, each iteration between remassing includes a set number of batches (e.g., the six batches shown in each training iteration of FIG. 5). If remassing is not to be performed after the most recent batch, the process 400 returns to 410 to select the next batch of inputs.

However, if a training iteration is complete and the training system should remass the inputs, the process 400 determines (at 440) individual gradients with respect to training time for each training input. As noted, in some embodiments these individual input gradients are not available as exact calculations and thus are instead estimated. Different embodiments may use different techniques for estimating the gradient. In some embodiments, the training system uses a graphics processing unit (GPU) or set of GPUs to perform the forward and/or back-propagation, and thus compute the gradients. However, the GPU uses gradients for a batch of inputs and thus, even if the gradients for individual inputs are calculated, these individual gradients may not be available for the score calculations. Thus, the training system of some embodiments estimates these gradients based on how the loss function for an individual input has changed over a set of prior training batches. The training system stores a number of these past loss function values for the individual input and estimates the gradient using, e.g., a linear regression of the past loss function values.

The process 400 then computes (at 445) a score for each training input based on a ratio of the loss function for the input to the gradient for the input. This score is higher for input training items that the network is having more trouble with but is inversely proportional to the gradient of the loss function for the input, because a higher gradient indicates that the network is converging more quickly for that input and therefore the network should (at least potentially) provide an accurate result for the input more quickly. Thus, the score is an estimate of the "time to happiness" for the individual input; that is, the amount of further training required for the network to provide an output value matching the expected output value for the input.

Specifically, some embodiments compute the score S for each item i using the equation $$S_i = \frac{\text{mean}_t(L_i)}{\max(-dL_i/dt, \epsilon_t)},$$

where $\epsilon_t = -dL/dt$ is the lowest percentile (1%) of slopes of all input items with positive $-dL/dt$ and the mean loss of which is above a particular threshold (in order to exclude potentially noisy slopes of inputs for which the network is already giving highly accurate results). The mean loss is the average weighted by inverse time difference relative to the most recent (at $t_0$) with weights $w_t = 1/(t_0 - t + 1)$, meant $(L) := \Sigma w_t L_t / \Sigma w_t$ (in order to give more emphasis to the recent values).

After computing the scores for each of the inputs, the process 400 returns to 410 to select another batch of training inputs from the set of available training inputs (or, as described below, to select which available inputs to use as the training set for the subsequent iteration). Based on the scores $S_i$, some embodiments form a vector of probabilities $$p_i = S_i / \sum_j S_j \tag{7}$$

and use these probabilities to select the next set of batches.

In some embodiments, the gradient and score calculation is based in part on how the input selection is performed. As noted, if a gradient is computed during training, this is based on all of the inputs in a batch. Some embodiments compute an "unbiased" estimate of the gradient for each particular input selected for a batch by weighting the gradient contributed by the particular input to the overall gradient by the inverse of the probability of selecting the particular input. The bias introduced by increasing the probability of selecting a given input is cancelled by downweighting its gradient by the same factor.

More rigorously, assume T to be the training set and $p_i$ the probability of including training input i in a batch M. Because |M| training inputs are selected $\Sigma_{i \in T} p_i = |M|$ will be true. If $g_i$ is the gradient computed during back-propagation for input i, then the gradient estimate for a batch M is given by:

$$G(M) = \frac{1}{|T|} \sum_{i \in M} \frac{g_i}{p_i}. \quad (8)$$

If uniform sampling (no remassing, and all inputs are treated equally) is used, then $p_i = |M|/|T|$ (i.e., the probability of an input being selected for a given batch is the number of inputs in the batch divided by the number of total available inputs). In this case, the gradient reduces to:

$$G_{uniform}(M) = \frac{1}{|M|} \sum_{i \in M} g_i, \quad (9)$$

However, with non-uniform sampling, the expectation of G(M) over all possible batches is given by:

$$\mathbb{E}_M[G(M)] = \frac{1}{|T|} \mathbb{E}_M\left[\sum_{i \in M} \frac{g_i}{p_i}\right] = \frac{1}{|T|} \sum_{k \in T} p_k \frac{g_k}{p_k} = \frac{1}{|T|} \sum_{k \in T} g_k, \quad (10)$$

which is the actual gradient for the training set. As such, the gradient estimate G(M) is unbiased. To use importance sampling, the probabilities $p_i$ need to be computed in such a way that accounts for the number of items in the overall training set and the number of items selected for each batch, as mentioned above.

Based on this, some embodiments select the items for a batch using stratified sampling. This process first sorts the items in the overall training set in order of decreasing unhappiness (i.e., how far away the output generated by the network for the item is from the ground truth output for the item), then divides the items into strata. The strata are defined such that (i) within each strata all of the items have approximately the same level of individual unhappiness and (ii) the combined unhappiness of all of the items within each strata is approximately the same. Thus, the strata with the items handled the worst by the network (those with the largest unhappiness) have the fewest items. The number of strata is set to equal the number of items that will be selected for a batch (|M|), and uniform random sampling is used to select one item from each stratum. Thus, the probability that a given item is selected for a particular batch is the reciprocal of the number of items in the stratum including that item. That is, if item i is in stratum k, then $p_i=1/|stratum_k|$. Because items with the highest level of unhappiness loss will often be a large percentage of the total combined unhappiness, care is required when defining the strata. As an example, if there are individual items that have a larger unhappiness loss than the total unhappiness (among all items) divided by the number of strata, then the stratum with the highest unhappiness items will have a larger combined unhappiness than the other strata.

Some embodiments use a procedure for determining the strata that handles this issue by starting from the items with the highest unhappiness while keeping track of the remaining total unhappiness in order to have an improved estimate of the total happiness of the remaining strata. This procedure also enforces an upper bound on the number of items in a stratum in order to establish a lower bound on the selection probability for any individual item.

The strata determination process receives T total items i, each having an unhappiness $U_i$, that need to be sorted into M (the number of items in a batch) strata. In addition, a user-defined hyperparameter max_disparity is defined, which specifies a maximum disparity in the number of training items per stratum. The process then determines the maximum number of items per stratum (max_per_stratum) by multiplying this disparity value by the ratio of T to M (i.e., the mean number of items per stratum). In addition, the process sorts the items i in order of decreasing $U_i$ and sets the following values: $T_{remain}=T$, $M_{remain}=M$, and $U_{remain}=\Sigma_i U_i$.

At this point, the process begins iterating through each stratum, first determining the minimum number of items to be added to the next stratum based on the following:

$$\text{min\_items}=\max(1, T_{remain}-(M_{remain}-1)\text{max\_per\_stratum}) \quad (11)$$

The process also verifies, in some embodiments, that this value min_items is less than or equal to the computed maximum number of items per stratum. Assuming that this is the case, the process computes a target total unhappiness for this next stratum as $$U_{target} = \frac{U_{remain}}{M_{remain}}$$

(i.e., the total unhappiness loss of the remaining items divided by the number of strata remaining).

To construct this next stratum, the process adds all of the items in the sorted list to the next stratum until (i) the stratum includes at least the computed value min_items and (ii) the total unhappiness of the added items is greater than the computed $U_{target}$. If the number of added items is greater than min_items, the last item added to the stratum is removed if doing so would result in a total unhappiness for the stratum closer to $U_{target}$ (i.e., if the total unhappiness after adding the item i exceeds $U_{target}$ by more than half of its $U_i$). These are now the items assigned to that stratum. Before moving to the next stratum, the process decrements $M_{remain}$ by 1 and updates $T_{remain}$ and $U_{remain}$ by subtracting the items added to this stratum. So long as $M_{remain}$ remains greater than 0 after this update, the process moves to the next stratum.

Using this process, the minimum probability for a given training item being selected for inclusion in the subsequent batch is given by 1/max_per_stratum, which is equal to (M/T) divided by the user-defined max_disparity. On the other hand, with uniform sampling across the training set the probability of selecting any item is simply (M/T). That is, the value max_disparity is the factor by which the minimum selection probability can decrease relative to uniform sampling of the training items.

As described above, in ordinary SGD the gradient for a batch is estimated using equation (9). The factor of 1/|M| is included automatically in any framework, and thus needs to be taken into account when computing the gradient weight for a given training item. Based on the use of importance sampling, the gradient estimate is given by:

$$G(M) = \frac{1}{|T|} \sum_{i \in M} g_i / p_i, \qquad (12)$$

which can be rewritten as $$G(M) = \frac{1}{|M|} \sum_{i \in M} w_i g_i, \qquad (13)$$

where $w_i = [|M|/(|T|p_i)]$. As such, the gradient weight to be used is $$w_i = \left[ |M| * \frac{|\text{stratum}|}{|T|} \right], \qquad (14)$$

in which [stratum] is the number of items in the stratum that includes item i. If the unlikely case that all of the items have an equal unhappiness loss, the weight reduces to $w_i=1$.

Using a remassing strategy such as that described above, in which certain inputs will be propagated through the network more often than other inputs, requires adjustment of the notion of a training epoch. Typically, one epoch is the time over which all of the inputs in the training set are propagated through the network once. However, when using stratified sampling, or any other method in which the frequency of use for some inputs is higher than the frequency of use for other inputs, some of these inputs will be propagated multiple times within an epoch (possibly even in consecutive batches). Furthermore, the strata with the lower-loss (happier) inputs will ideally become large as training goes on such that only a portion of these inputs are sampled in each iteration over the entire training set. Some embodiments define an epoch in this case by requiring that the expected number of times an input is used in an iteration over the dataset is exactly one.

This expectation is calculated with respect to the distribution of losses in some embodiments, because loss (unhappiness) is used to prioritize the inputs. Given a number of batches N, of size $|M|$, and strata $\sigma_1, \sigma_2, \ldots \sigma_{|M|}$, the average number of times an item $s_i \in \sigma_i$ is used during an epoch is given by $$r_i \approx \frac{N}{|\sigma_i|}.$$

The constraint on the expected number of times an item is sampled is given by $$\mathbb{E}_U[r] = \frac{\sum_i U_i r_i}{\sum_i U_i} \approx \frac{\sum_i U_i \frac{N}{|\sigma_j|}}{\sum_i U_i} = N \frac{\sum_i \overline{U}_{\sigma_i}}{U_{tot}} \stackrel{!}{=} 1, \qquad (15)$$

where $\overline{U}_\sigma$ is the average loss in the stratum $\sigma$. This can be used to find the number of batches per epoch needed to satisfy the constraint:

$$N = \frac{U_{tot}}{\sum_\sigma \overline{U}_\sigma}. \qquad (16)$$

Because the total loss in each stratum is approximately the same, $$\overline{U} \approx \frac{\frac{U_{tot}}{|M|}}{|\sigma_i|}. \qquad (17)$$

Given this, the number of batches in an epoch becomes $$N \approx \frac{|M|}{\sum_i^{|M|} |\sigma_i|^{-1}}. \qquad (18)$$

In addition to using scores (e.g., the scores based on unhappiness to gradient ratio described above) to select training inputs for batches of inputs during training that modifies the network parameters, some embodiments also use a similar scoring methodology to select training inputs for the set of available training inputs. Some embodiments divide all potential inputs into a training set that is used for training the network parameters as described above and a validation set that is used for verifying the network as trained. Key to this process is that the validation set only includes inputs that have not been used at any point to train the network (i.e., from the perspective of the trained network these inputs are completely new when used for verification of the network). This enables the testing (validation) of the network using entirely new inputs. After each iteration of network validation, a portion of the validation inputs are added to the training set (and thus removed from the validation set for any further validation) in a rigorous manner.

In addition, each time the network is tested, the validation inputs can be used to tune various hyperparameters. These hyperparameters are not actual parameters of the network but instead define various aspects of how the network is trained. For instance, hyperparameters may include loss function coefficients, how quickly certain factors in the loss function are changed during the course of training (e.g., to modify the relative importance of different factors in the loss function), the learning rate that specifies how aggressively the network parameters are modified based on the gradients, how much regularization is factored in (i.e., how much changes to the weights are dampened in order to avoid overfitting the weights to the specific inputs in the training set), etc. In general, the better the hyperparameter values are set, the more predictive the resulting trained network will be for new input data not used in training.

To better tune the hyperparameters, some embodiments attempt to minimize a description length score that specifies a description length of the network. However, rather than computing a description length based on, e.g., a number of bits required to describe the trained network (i.e., to describe the parameters of the trained network), the description length score of some embodiments specifies a measure of the number of bits required to reconstruct the trained network through the hyperparameter tuning technique. The optimization algorithm for the description length score thus seeks to minimize the sum of (i) the bits required to specify the correct output value for each new training input and (ii)

the bits required to update the hyperparameters at each iteration. In general, the smaller the loss function value for a given validation input, the smaller the number of bits that are required to specify the correct output value for that input.

To measure the bits required to specify the correct output value for each new training input, some embodiments employ the information theory concept of a sender and receiver. This concept assumes that both the sender and receiver have adequate computing resources to perform the MT network training, use the same training method, and start with the same randomized parameters so that the sender is always aware of the computations performed by the receiver (i.e., the sender always has knowledge of the receiver's version of the MT network). The sender also knows both the inputs (e.g., images, audio snippets, etc.) and the ground truth outputs (e.g., categories for images, face identifications, etc.), whereas the receiver initially only knows the inputs. While one measurement of the bits required to specify the correct output value to the receiver is simply the bits required to provide this information, because the sender can determine what the receiver's network will generate as output, this measurement can be minimized by noting that the sender need only specify the error correction bits. For a categorization network that outputs a probability for each possible category, the closer the receiver network is to outputting a (normalized) value of 1 for the correct category, the smaller the number of error correction bits required. Thus, the first term in the function to be minimized is an error measure of the network (i.e., the more predictive the network already is, the fewer bits required to provide the receiver with the next set of training inputs).

The value in minimizing the sum of the error correction bits and the hyperparameter update bits is that this represents a description of a network that is much more compressed than the entirety of the network parameters. Minimum description length theory states that the smaller (more compressible) the MT network (or any other model), the more predictive that network will be on new inputs (i.e., inputs not used during training).

In order to minimize this network description length (the sum of the error correction bits and the hyperparameter update bits), some embodiments perform hyperparameter optimization at each iteration. Specifically, the conceptual sender seeks to optimize the hyperparameters for the upcoming round of training by minimizing the combination of the hyperparameter updates and the error bits for the subsequent set of training inputs (i.e., not the training inputs added for the upcoming round of training, but rather the training inputs to be added for the following round of training), after the network is trained using the entire set of training inputs for the upcoming round of training (i.e., all of the previous training inputs as well as the newly added set of training inputs). Because the sender can replicate the training performed by the receiver, the sender has the ability to make this calculation. To perform this minimization, optimization techniques (e.g., gradient descent) are used to modify the hyperparameters. The hyperparameter optimization and training set updates of some embodiments are described in greater detail in U.S. patent application Ser. No. 16/453,622, filed Jun. 26, 2019, and U.S. patent application Ser. No. 16/780,842, filed Feb. 3, 2020, both of which are incorporated herein by reference.

Much like the use of unhappiness-related scores to modify how the inputs in the training set are selected for different batches, some embodiments use the error bit calculation for each validation set input to determine which inputs to transfer to the training set. For instance, some embodiments transfer validation set inputs with the highest number of associated error bits to the training set (so that subsequent training can use the validation set inputs that the network has the hardest time with). Specifically, some embodiments transfer a number of these validation set inputs to the training set until the cumulative error bits associated with the remaining validation set inputs falls below a threshold (e.g., a user-specified threshold).

Figure 6:
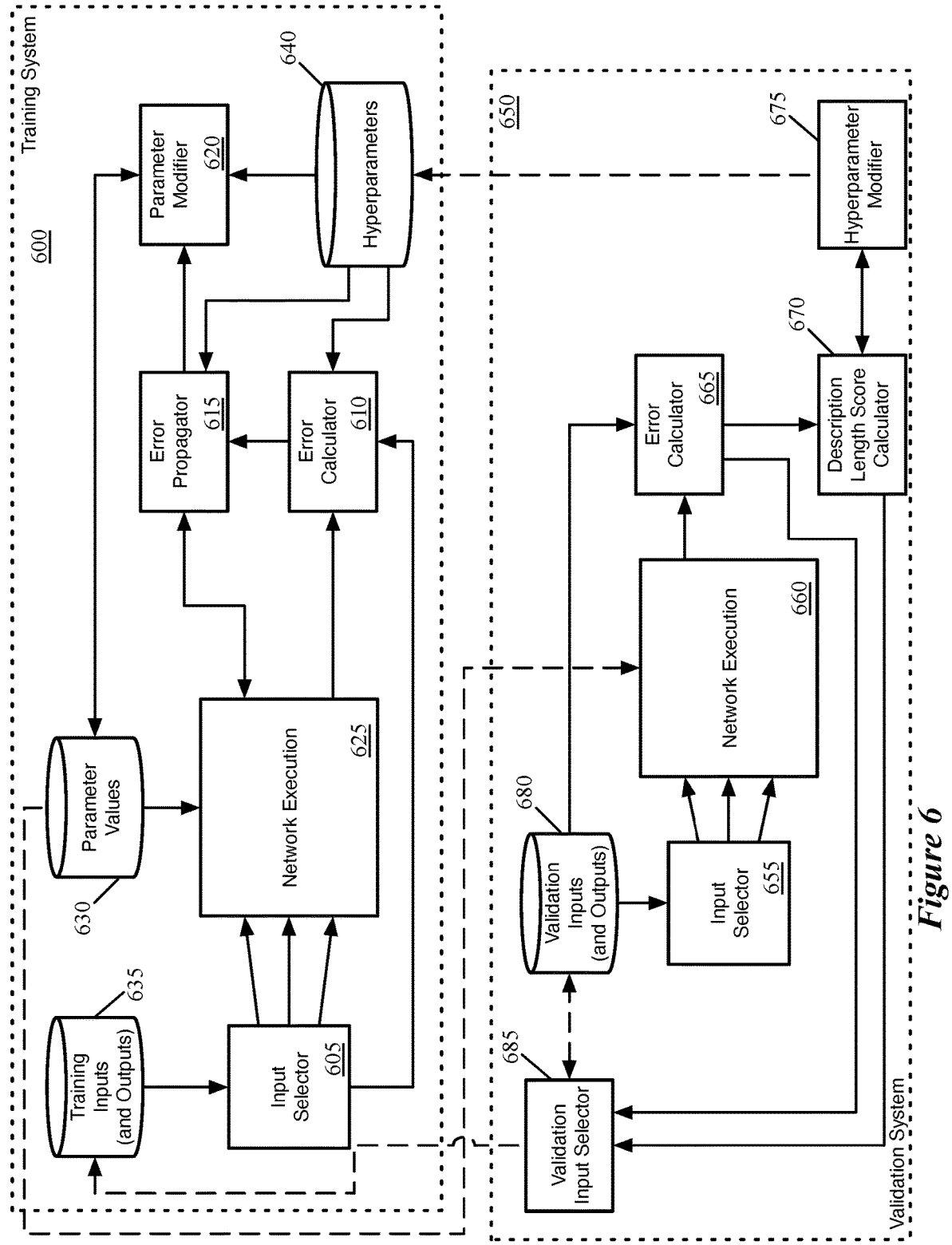
FIG. 6 conceptually illustrates a training system of some embodiments that iteratively adds inputs from a validation set to the training set over the course of multiple training runs, using scores for the validation set inputs to determine which of these inputs should be added to the training set.

FIG. 6 conceptually illustrates a training system 600 of some embodiments that iteratively adds inputs from a validation set to the training set over the course of multiple training runs, using scores for the validation set inputs to determine which of these inputs should be added to the training set. The training system 600 uses a validation system 650 to test the predictiveness of the trained network after each iteration and uses a description length score based on (i) potential hyperparameter modifications and (ii) the error generated for validation set inputs when incorporating these potential modifications in order to determine optimal hyperparameter modifications at each iteration. The training system 600 modifies the parameters (e.g., weight values) for a machine-trained network over the course of these multiple training iterations, and the resulting network can then be used for its particular purpose (e.g., embedded on a device). For these purposes, a training iteration is defined as one or more epochs, after which the training set is updated by adding inputs from the validation set.

As shown, the training system 600 includes an input selector 605, a network execution module 625, an error calculator 610, an error propagator 615, and a parameter modifier 620. In some embodiments, all of these modules execute on a single device, such as a server, a desktop or laptop computer, a mobile device (e.g., a smartphone, tablet, etc.), a virtual machine, etc. In other embodiments, these modules may execute across multiple interconnected devices (or virtual machines), or separate instances may execute on multiple devices (or virtual machines) for additional computing power. In some embodiments, the other modules shown in FIG. 3 are present in the training system 600 (e.g., the gradient estimator and input score calculator that are used to select inputs for a training batch based on the gradient to loss score for each input, as described above). For at least a first training iteration, the training system 600 operates as described above by reference to FIG. 3, using the parameter values 630 to define the network, the training inputs (and ground truth outputs) 635, and with the training governed by the hyperparameters 640.

As mentioned, some embodiments perform multiple training runs with changing training inputs 635 and perform validation using the validation system 650 to determine how predictive the trained network parameters are after each training run (or after a group of training runs). In addition, the validation system 650 is used to (i) modify the training parameters (hyperparameters) 640 in order to optimize the resulting network as well and (ii) identify ideal inputs to add to the training set for subsequent training runs. As shown, the validation system 650 includes an input selector 655, a network execution module 660, an error calculator 665, a description length score calculator 670, a hyperparameter modifier 675, and a validation input selector 685.

The validation system receives the network parameter values 630 (e.g., the weight values of the network) as trained by the training system 600 and measures the predictiveness of this network. The network execution module 660 operates in the same manner as the network execution module 625 used for training, and a set of validation inputs (e.g., a batch selected from the group of validation inputs 680) are used to validate the training by determining how predictive the parameter values 630 are for inputs that were not used for training. One key for testing machine-trained networks is that the validation inputs used to measure a network's predictiveness should not be inputs used during training. The training inputs will not be indicative of predictiveness because the network parameters have been adjusted specifically to minimize loss for those inputs. However, over the course of multiple training iterations, it is possible to use some inputs as validation inputs after a first training run, then add these inputs to the set of training inputs for the next training run (so long as these inputs are not used for any future validation).

The error calculator 665 calculates the error in the network output for the validation inputs 680, in order to measure the predictiveness of the network after a training run. Because the validation system 650 is not modifying the weight values, this error is not used for backpropagation to modify the weights. Instead, a description length score calculator 670 uses the measured error in some embodiments, along with additional information (e.g., possible hyperparameter modifications, calculations of error due to those possible modifications) in order to calculate a description length score (and attempt to minimize this score). In some embodiments, the error calculator 665 calculates multiple different loss scores for each item. For instance, in some embodiments the error calculator 665 calculates both an entropy score as well as a cross-entropy loss.

As mentioned above, hyperparameter tuning is typically a difficult process, and many training systems use guesswork to modify the hyperparameters. However, to better tune these hyperparameters, some embodiments attempt to minimize a description length score that specifies a description length of the trained network (e.g., a number of bits required to describe the network). One possible calculation for such a description length is the number of bits to describe the parameters of the trained network (which would push weight values to 0). However, rather than computing the description length score based on this metric, in some embodiments the description length score calculator 670 uses a measure of the number of bits required to reconstruct the trained network through a prequential hyperparameter tuning technique. The optimization algorithm for the description length score thus seeks to minimize the sum of (i) the bits required to specify the correct output value for each new training input and (ii) the bits required to update the hyperparameters at each iteration.

To measure the bits required to specify the correct output value for each new training input, some embodiments employ the information theory concept of a sender and receiver. This concept assumes that both the sender (e.g., the validation system 650) and receiver (e.g., the training system 600) have adequate computing resources to perform the training algorithm, use the same training method, and start with the same randomized parameters so that the sender is always aware of the computations performed by the receiver (i.e., the validation system 650 always has knowledge of the training system 600 version of the network, and how that network will be modified based on the new training inputs added each iteration). In this conception, the sender also knows both the inputs (e.g., images, audio snippets, etc.) and the ground truth outputs (e.g., categories for images, face identifications, etc.), whereas the receiver initially only knows the inputs.

While one measurement of the bits required to specify the correct output value to the receiver (i.e., for the validation system 650 to indicate the ground truth output for each new training input) is simply the bits required to provide this information, because the validation system can determine what the training system's network will generate as output, this measurement can be minimized by noting that the sender need only specify the error correction bits (i.e., the bits needed to get from the network output to the correct output). For a categorization network that outputs a probability for each possible category, the closer the receiver network is to outputting a (normalized) value of 1 for the correct category, the smaller the number of error correction bits required. Thus, the first term in the function to be minimized is an error measure of the network (i.e., the more accurate the network already is, the fewer bits required to provide the receiver with the next set of training inputs). While initially this may be a larger number of bits, once the network has been through a training run, the size of the error description should decline quickly.

The value in minimizing the sum of the error correction bits and the hyperparameter update bits is that this represents a description of a network that is much more compressed than the entirety of the network parameters. Minimum description length theory states that the smaller (more compressible) the network, the more predictive that network will be on new inputs (i.e., inputs not used during training). As such, because the goal of training the network is to have as predictive a network as possible (e.g., avoiding overfitting), the description length score calculator 670 attempts to minimize this description length score.

Thus, in order to minimize this network description length (the sum of the error correction bits and the hyperparameter update bits), the hyperparameter modifier 675 of some embodiments performs hyperparameter optimization at each iteration. Specifically, the validation system 650 (the conceptual information theory sender) seeks to optimize the hyperparameters for the upcoming round of training by minimizing the combination of the hyperparameter updates and the error bits for the subsequent set of training inputs (i.e., not the training inputs added for the upcoming round of training, but rather the training inputs to be added for the following round of training), after the network is trained using the entire set of training inputs for the upcoming round of training (i.e., all of the previous training inputs as well as the newly added set of training inputs). Because the validation system 650 (the sender) can replicate the training performed by the training system 600 (the receiver), the validation system 650 has the ability to make this calculation.

To perform this minimization, optimization techniques (e.g., gradient descent) are used to modify the hyperparameters. The hyperparameter modifier 675, in concert with the description length score calculator 670, determines the optimal modifications to the hyperparameters 640 at each iteration, and provides these updates to the training system 600. These modifications, for example, might modify the learning rate from one training iteration to another (i.e., to modify the rate at which weight values are changed during backpropagation), increase or decrease regularization factors (which tend to push weight values towards 0 in order to reduce overfitting), or modify other hyperparameters (as mentioned, the specific hyperparameters used will depend on the specific training algorithm and loss function used by the training system 600).

The validation input selector 685 selects, prior to each training iteration other than the first iteration (i.e., after validation has been performed), which of the validation inputs (and the corresponding ground truth outputs) 680 will be transferred to the training inputs 635 for subsequent training iterations. In some embodiments, the validation input selector 685 transfers the validation inputs with the highest number of associated error bits. In other embodiments, a different loss function is used to identify the validation inputs with the highest loss in the previous round of training. For instance, if the network is trained to classify each input into one of a set of categories, some embodiments use an entropy measurement of loss. Each input i in the validation set (or at least the validation set items used in the most recent validation testing) is scored using the following entropy function that sums over the categories c:

$$H_i = -\Sigma p_c \log(p_c). \qquad (19)$$

The validation input selector 685 transfers items from the validation inputs 680 with the highest scores (e.g., using the above entropy function) until the cumulative number of error bits (e.g., given by a cross-entropy loss) reaches a threshold. Specifically, some embodiments transfer items until the cumulative number of error bits is larger than a user-specified threshold.

It should be understood that FIG. 6 illustrates one example of a conceptual training/validation system, and that other systems may embody the invention and perform similar functions as well. For instance, some embodiments do not use a separate validation system, but rather use the same modules for training and validation, so long as inputs are not used for validation once they have been used for the actual network training.

Figure 7:
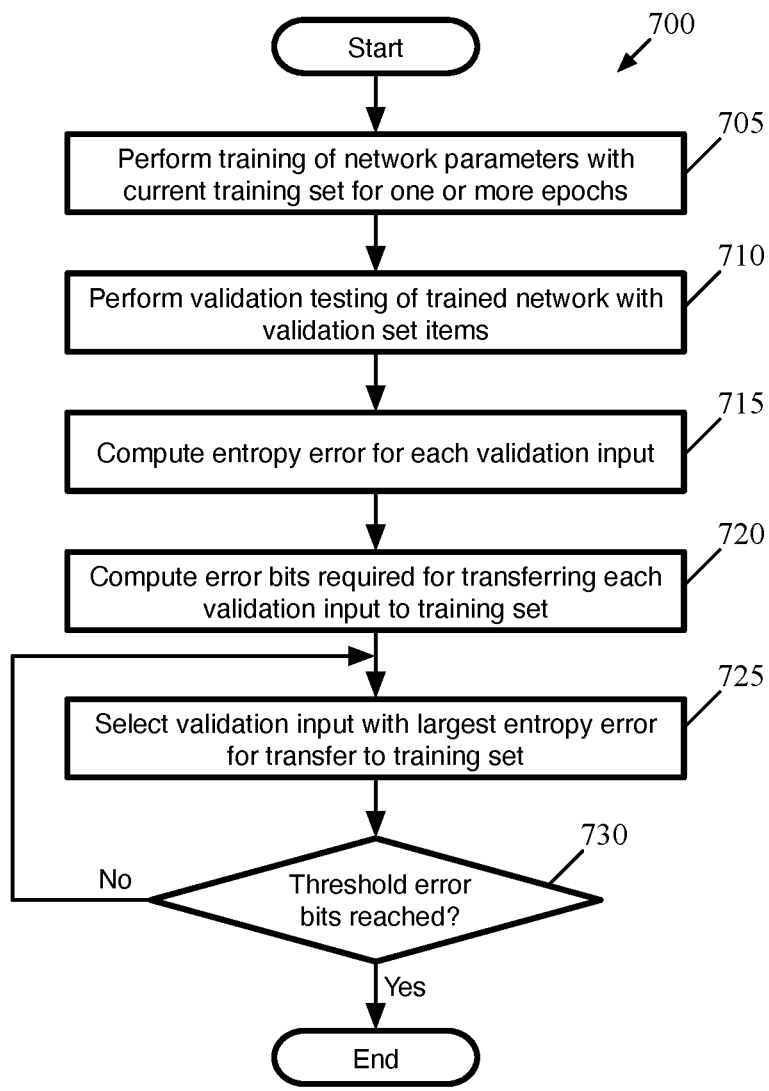
FIG. 7 conceptually illustrates a process of some embodiments for selecting validation inputs to transfer to the training set.

FIG. 7 conceptually illustrates a process 700 of some embodiments for selecting validation inputs to transfer to the training set. The process 700 is used in some embodiments to ensure that each iteration, the validation set items for which the network performs the worst are transferred to the training set so that they can be used to inform the network parameters. In some embodiments, the process 700 is performed by the training system 600 and validation system 650 (e.g., at least in part by the validation input selector 685). The process 700 will be described in part by reference to FIG. 8, which conceptually illustrates the transfer of highest-error items from a training set to a validation set between two training iterations.

As shown, the process 700 begins by performing (at 705) training of the parameters of a network with a current training set for one or more epochs. As indicated above, an epoch is a group of one or more batches in which the training set items are propagated through the network and the calculated loss function back-propagated to train the network parameters. The loss function may include an error term (e.g., cross-entropy or another measure depending on the type of input data and purpose of the network) as well as other terms that affect training of the network parameters (e.g., pushing the parameters to zero or other specific values, regularization terms, etc.). In some embodiments, an epoch is defined such that the expected number of times each training input is selected is equal to 1.

Figure 8:
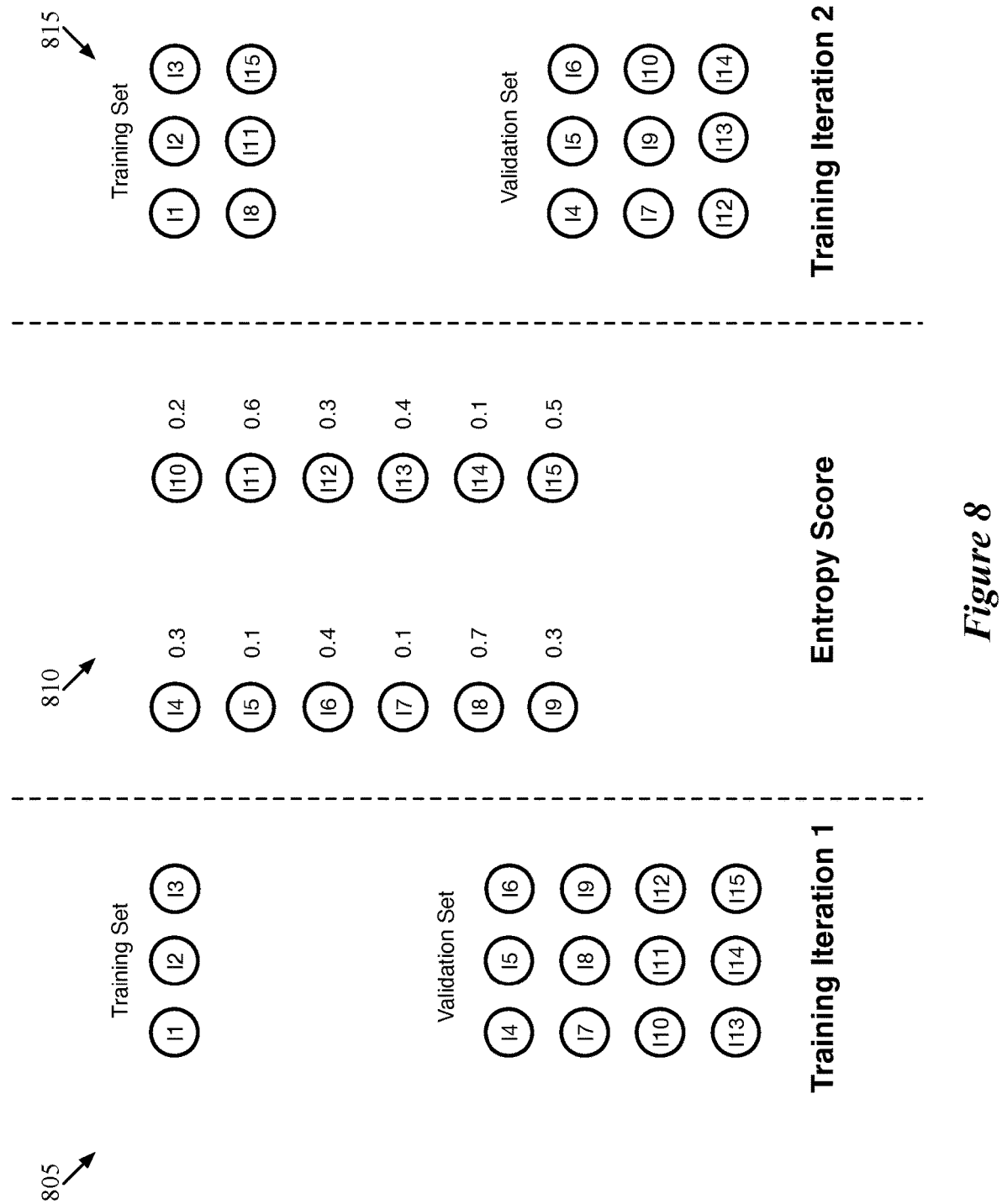
FIG. 8 conceptually illustrates the transfer of highest-error items from a training set to a validation set between two training iterations.

FIG. 8 illustrates that in a first training iteration 805 the training set includes three inputs I1-I3 and the validation set includes twelve inputs I4-I15. It should be understood that the example shown in FIG. 8 is a simplified example, and that typically a larger number of inputs is used for both the training and validation sets.

After performing training, the process 700 performs (at 710) validation testing using some or all of the validation inputs. Depending on the number of validation inputs available, some embodiments may only use a subset of the available inputs for validation testing after a particular iteration. To perform validation testing, the validation system processes a set of the validation inputs through the network as trained after the previous training iteration to determine how accurate the trained network is at handling inputs that have not been used during training.

The process 700 computes (at 715) the entropy score for each input and (at 720) the error bits required to transfer each validation input to the training set. The entropy score is given, in some embodiments, by equation (19) above. In some embodiments, the entropy score can be calculated by both sender and receiver (because it does not require knowing the ground truth output). Some embodiments use cross-entropy loss to determine the error bits needed to transfer each validation set input to the training set, as described above.

FIG. 8 illustrates that after validation testing of the network, the entropy score 810 is computed for each of the validation inputs I4-I15. As shown, input I4 has entropy score of 0.3, input I5 has entropy score of 0.1, input I6 has entropy score of 0.4, input I7 has entropy score of 0.1, input I8 has entropy score of 0.7, input I9 has entropy score of 0.3, input I10 has entropy score of 0.2, input I11 has entropy score of 0.6, input I12 has entropy score of 0.3, input I13 has entropy score of 0.4, input I14 has entropy score of 0.1, and input I15 has entropy score of 0.5.

Next, the process 700 selects (at 725) the validation input with the largest entropy score for transfer to the training set. In some embodiments, this means that the training inputs for which the network is the least certain (irrespective of whether the certainty for any given input is correct) are transferred to the training set. Other embodiments transfer the validation inputs with the highest cross-entropy loss rather than the validation inputs with the highest entropy score.

The process 700 then determines (at 730), having transferred the selected item, whether an error bits threshold has been reached. In some embodiments, the process adds the transferred item to the training set and adds the error bits associated with that item to a cumulative number of error bits transferred. Once this cumulative number of error bits crosses a threshold, the process 700 determines that enough validation inputs have been transferred to the training set, and ends. Otherwise, the process 700 returns to 725 to select the validation input with the next highest entropy score to transfer that input to the training set. FIG. 8 illustrates that for a second training iteration 815 the inputs I8, I11, and I15 have been transferred to the training set from the validation set, as these three inputs had the highest entropy scores during the previous validation testing.

In some embodiments, remassing is done at various different times within the network training process, including to select training inputs from the training set to use for a set of training batches as well as to select which validation inputs are transferred to the training set from the validation set. These different remassing operations, in some embodiments, use different criteria (e.g., some of the criteria described above).

Figure 9:
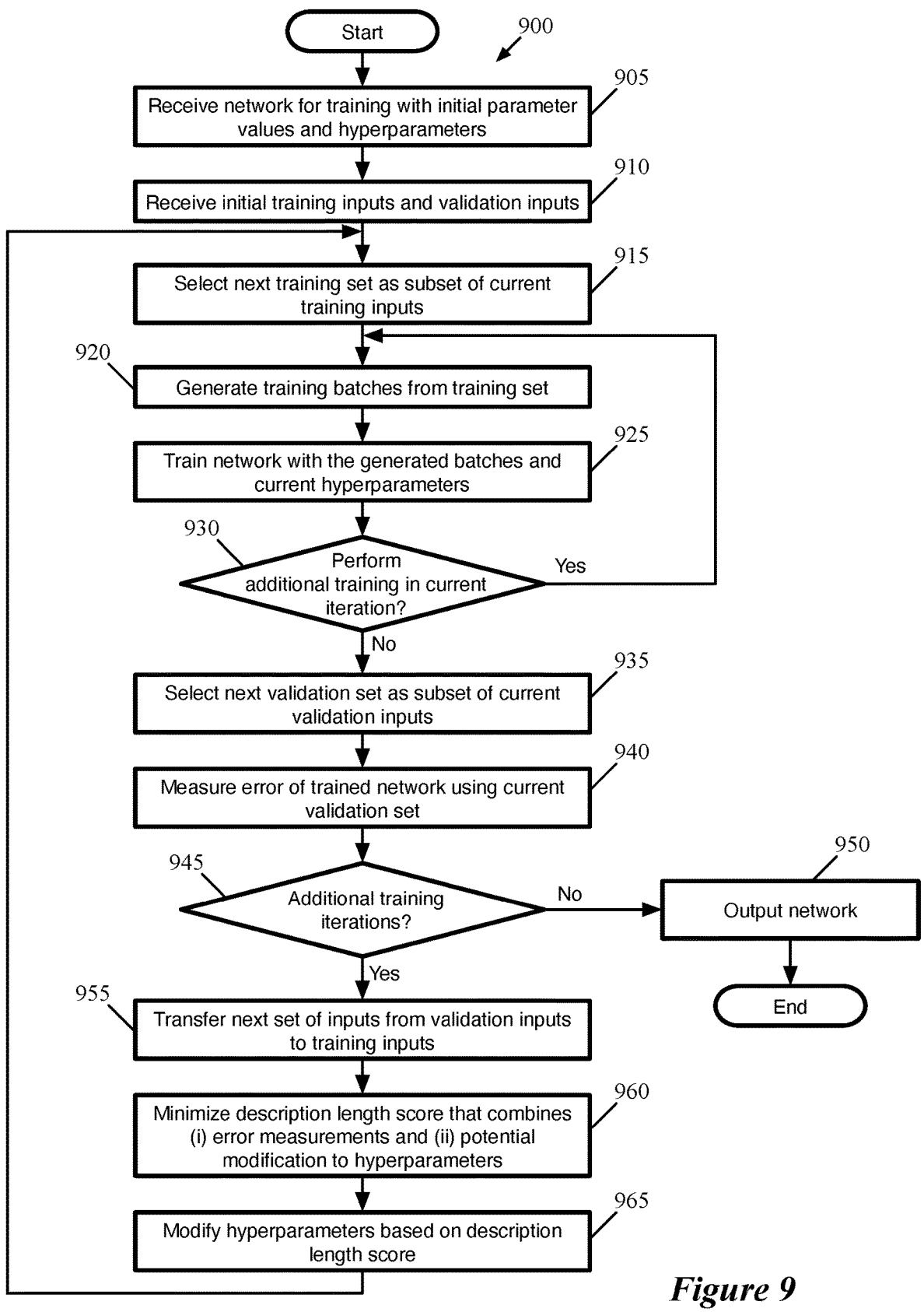
FIG. 9 conceptually illustrates a process of some embodiments for training a network over several iterations.

FIG. 9 conceptually illustrates a process 900 of some embodiments for training a network over several iterations. This process 900 trains a network while (i) transferring validation inputs to the training set and optimizing hyperparameter values used in that training (in order to best optimize the training of the network) each iteration, in addition to optimizing the selection of which training inputs to use during each training iteration. The process 900 is used to optimize the resultant network such that the network will be maximally predictive (i.e., will provide the best results for new inputs not used in training of the network). In some embodiments, the process 900 is performed by the training system 600 and validation system 650, or a similar combined system. The process 900 will be described in part by reference to FIG. 10, which conceptually illustrates the iterative transfer of inputs from the validation set to the training set.

As shown, the process 900 begins by receiving (at 905) a network to be trained, along with initial weight values and hyperparameters. In some embodiments, a network definition specifies the structure of the network (i.e., the number of input nodes, the number of layers and type of each layer, the filter structures for convolutional layers, etc.). The network may be a feed-forward convolutional neural network, a recurrent network, or any other type of network with trainable parameters. The initial parameter (e.g., weight) values may be generated randomly in some embodiments (e.g., randomly assigning each weight a value between −1 and 1). The initial hyperparameter values may be assigned randomly (within an acceptable range for each hyperparameter) or manually in different embodiments.

Next, the process 900 receives (at 910) an initial set of training inputs and validation inputs. In some embodiments, the training system receives the training inputs while the validation system receives the validation inputs (and is also allowed to have knowledge of the training inputs). It should be noted that in some embodiments, the training system and validation system actually use the same system, and the difference is a conceptual one used to (i) keep track of the description length of the network and (ii) ensure that network validation never uses an input that was used to train the network. In some embodiments, the initial division of all of the available inputs between the training inputs and the validation inputs is random. That is, a combined system receives all of the available inputs and randomly assigns some of the inputs to the validation set and the other to the training set. In some embodiments, the validation system also calculates the error bits required to provide the training system with the initial training inputs, as this data is used for computing the minimum description length score (which requires the inclusion of the bits needed to describe all of the training inputs used).

Figure 10:
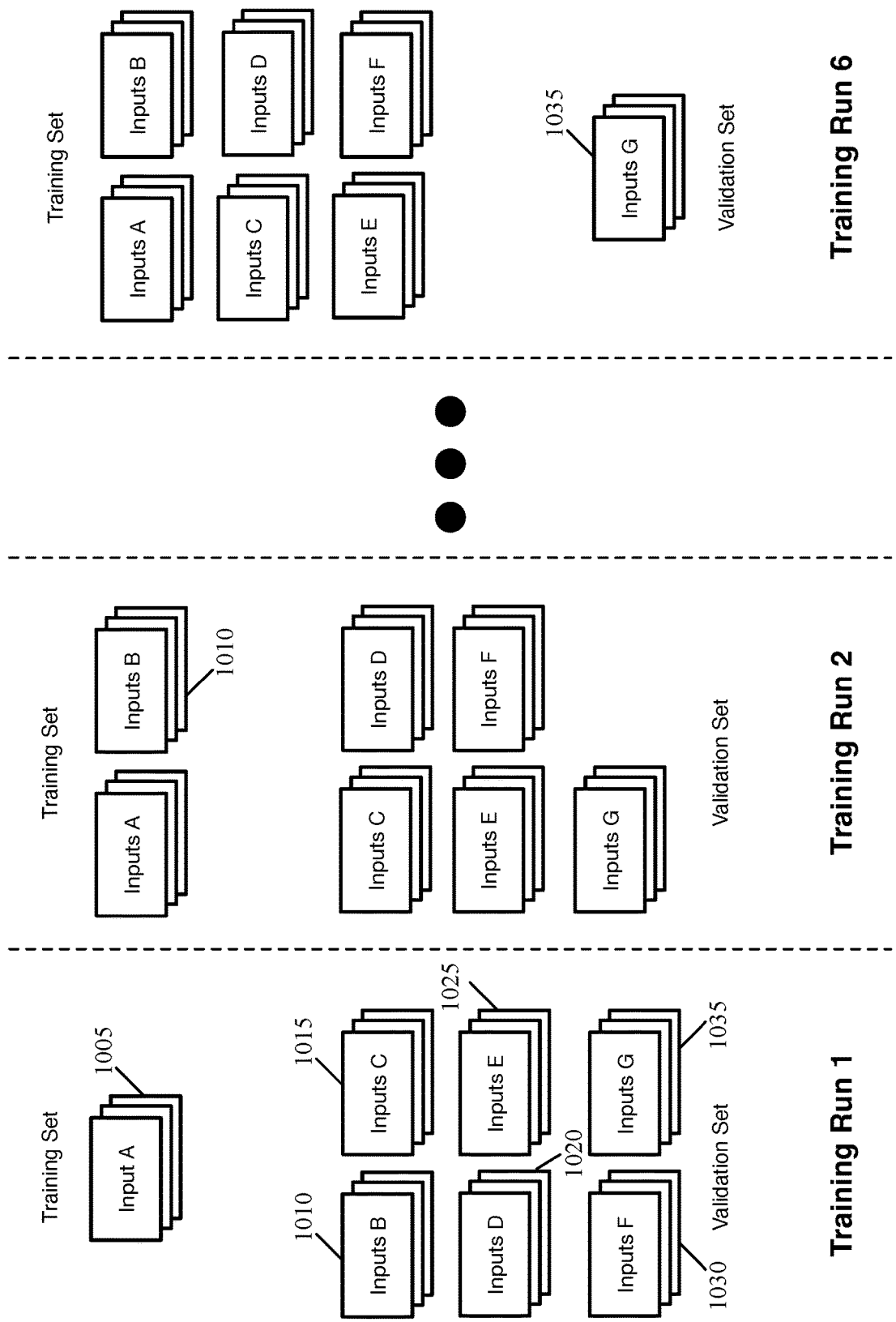
FIG. 10 conceptually illustrates the iterative transfer of inputs from the validation set to the training set.

FIG. 10 illustrates that at a first iteration of the network training system, a first set of inputs 1005 are in the training set, while numerous additional sets of inputs 1010-1035 are used for validation. Where this figure shows a set of inputs, it should be understood that this represents both the input as well as a ground truth network output. Depending on the type of network being trained, these inputs may be images, audio snippets, video snippets, etc. Similarly, depending on the network, the ground truth outputs could be categories (e.g., identifying the correct category from a set of possible output categories for an image or other input), binary determinations (e.g., specifying whether a particular audio snippet is a human voice), or other appropriate network outputs.

The process 900 then begins its first training iteration. As shown, the process 900 selects (at 915) the next training set (i.e., the training set for the next iteration) as a subset of the current training inputs. In some embodiments, in the first iteration all of the available training inputs are selected for the training inputs. Subsequently, however, additional inputs will have been transferred from the validation inputs to the available training inputs, so a larger number of training inputs will be available. To select the training set for a training iteration from the available training inputs in subsequent iterations, some embodiments use the remassing scheme described above that orders the available inputs based on a metric that estimates the amount of training time required for the network to produce an accurate output for the input. Specifically, some embodiments order the input items based on the ratio of the computed loss (e.g., cross-entropy loss or another metric) for an input to the gradient of the loss function for that input. In different embodiments, either the inputs with the highest scores (using either this loss to gradient ratio score or a different metric) are selected for the training set until a desired number of inputs is reached, or the scores are used as weights for a random selection of the training set inputs from the available training inputs.

Next, the process 900 generates (at 920) training batches from the training set (i.e., minibatches). In some embodiments, each training iteration includes multiple sets of batches that are used to perform training. In some embodiments, the batches are selected using the stratified sampling described above. For the initial batches, all of the training items are treated as equivalent and the batch generation is handled randomly. Subsequently, once the training inputs have been propagated through the network at least once, the strata may be determined based on the loss (e.g., cross-entropy loss) for each training input during one or more previous iterations (e.g., the last time the training input was used) or the scores that are used for training set selection (at operation 915).

The process 900 then trains (at 925) the network using the current batches of training inputs and the current hyperparameters. In some embodiments, training the network involves forward propagating each of the batches of inputs through the network, calculating the loss function for each of these batches of inputs (by calculating the loss for each input), backpropagating the batch of inputs to determine loss gradients with respect to each parameter, and using these loss gradients to adjust the parameters (e.g., the weights and other parameters). For the hyperparameters, the first training run uses the initially set values (e.g., manually set hyperparameter values). These hyperparameters, as described above, affect how the training is performed (e.g., how much the parameters are adjusted based on the gradients, what terms are included in the loss function in addition to error terms and how much weight these terms are given, etc.).

The process 900 then determines (at 930) whether to perform additional training in the current iteration. Some embodiments always use a set number of groups of training batches per iteration, while other embodiments vary the number of groups of training batches based on an exit condition (e.g., when the network has reached a particular level of accuracy for the currently-selected training set inputs). If additional training will be performed, then the process 900 returns to 920 to generate a new group of training batches from the training set (at this point, the same training set is used). In some embodiments, the strata for the inputs in the training set are determined based on the error calculated for each input during the last group of batches.

Once the training is complete for the current iteration, the process 900 moves onto performing validation testing. As shown, the process 900 selects (at 935) the next validation set (i.e., the validation set for the next testing) as a subset of the current validation inputs. Whereas the number of available training inputs increases each training iteration, the number of available validation inputs decreases correspondingly as the validation inputs are transferred to the training inputs. In some embodiments, in the first iteration there is no information yet about any of the validation inputs, so the validation set is selected randomly from the available validation inputs. For subsequent iterations, some embodiments order (or weight) the validation inputs based on various factors (e.g., the loss previously computed for those inputs) or continue to use random selection of the validation inputs.

The process 900 then measures (at 940) the error of the trained network using the current validation set. Using the validation inputs (i.e., inputs not used in training the network) allow the predictiveness of the network to be measured (because training inputs have influenced the changes to the network parameters, the network's performance for the training inputs cannot be indicative of its predictiveness). In addition, the error of the network is used in calculating the description length score, though in some embodiments the description length score uses the future error after a subsequent training run in determining the description length score and optimizing the hyperparameters.

The process 900 then determines (at 945) whether to perform additional training iterations. Some embodiments always perform training iterations until the entire validation set has been added to the training set, irrespective of the error measurement. Other embodiments, however, stop performing training if the network is adequately predictive on the remaining validation inputs, or if the error measurement has not changed (or has changed less than a threshold) over one or more iterations. Other embodiments simply train the network for a pre-specified number of iterations. Once additional training is no longer required, the process 900 outputs (at 950) the network (i.e., outputs the network parameters).

On the other hand, if additional training is required, the process 900 transfers (at 955) a next set of inputs from the validation inputs to the training inputs. In some embodiments, these inputs moved to the training inputs are some of the inputs most recently used for validation (i.e., at 920). As described above by reference to the process 700, some embodiments transfer the validation inputs with the highest entropy scores. As shown in FIG. 10, a subset of the validation inputs available for the most recent training iteration are moved to the training set; instead, only a subset of these inputs are transferred at each iteration. For instance, after the first iteration of training, the set of inputs 1010 is transferred from the validation set to the training set for the second training iteration. In this example, over the course of several iterations, all but the last remaining set of inputs 1035 are transferred from the validation set to the training set. In addition, for a final iteration, some embodiments transfer the last set of inputs to the training set, and perform a final round of training using these inputs as well. Other embodiments, as described, stop the training process prior to transferring all of the inputs, so long as the network is adequately trained at that point.

Next, the process 900 attempts to minimize (at 960) a description length score that combines (i) error measurements and (ii) potential modifications to hyperparameters. In some embodiments, as mentioned, the error measurement used for the description length score is a measure of the error for a next set of validation inputs to be added to the training set, not the set of validation inputs just moved to the training set. As described above, because the sender can replicate the training performed by the receiver, the sender has the ability to make this calculation. To perform this minimization, optimization techniques (e.g., gradient descent) are used to modify the hyperparameters. Specifically, some embodiments compute (or at least estimate) the gradient of the description length score with respect to a vector of hyperparameters.

To measure the error bits for the description length score, some embodiments use a system of codebooks. Specifically, for a categorization network, some embodiments define a meta-codebook with one codebook for each category. For each set of training inputs, the bit cost according to the current meta-codebook is added to the description length score. For instance, the bit cost for an input assigned to category i by the training system that is actually ground-truth category j would have a bit cost of $-\log(code_{ij}/\Sigma code_{ik})$. Using the sender/receiver formulation, the codebook for a category i is updated by accumulating the number of assignments by the receiver's network of a new input to category i when it is from the true category j (noting that i and j may be identical). A codebook would be used by first normalizing its counts to probabilities that add to 1 by dividing by their sum. In some embodiments, the initial (first iteration) meta-codebook consists of $code_{ij}=1$ representing a uniform (uninformed) distribution of categories for the first set of training inputs (before the network is trained). For a subsequent set of inputs to be added to the training set, the algorithm adds 1 to $code_{ij}$ if an input is assigned to category i and is actually of category j. Some embodiments also add 1 to each diagonal entry $code_{ii}$ in anticipation of the improvement in the next training run. Other embodiments measure the error by using log (1/p) as a measure of the bits needed to communicate each input, where p is the normalized categorization probability for the correct category for a given input output by the network (trained using the updated hyperparameters) for that input. Thus, as p→1, the number of error bits for that input approaches 0 (i.e., the more predictive the network is after being trained with a new set of hyperparameters, the fewer bits required to provide the next set of inputs).

Meanwhile, the hyperparameter modification bits added to the description length score increase with the size of the change for each hyperparameter in some embodiments. Some embodiments use a set (e.g., 8) of discrete possible hyperparameter values and use a code that specifies to either keep the same hyperparameter, decrease by one value within the predefined set, or increase by one value within the predefined set. At each iteration, the total description length score is minimized for that iteration and added to the total score. This description length score (accounting for hyperparameter modification bits) should be smaller than an upper bound that can be set on the score in the case in which the hyperparameters are not modified throughout training. In this upper bound case, the error bits for providing each new set of training inputs are computed and added to the score at each iteration, assuming the hyperparameters are held constant. By optimally modifying the hyperparameters (and therefore trading hyperparameter modification bits for error bits), an overall score can ideally be achieved.

Based on this minimization, the process modifies (at 965) the hyperparameters. The process then returns to 915 to select the next training set from the currently available inputs (in different embodiments, the newly transferred inputs may or may not be available for selection, depending on how this selection is performed). As mentioned, some embodiments continue until either the network is adequately predictive or until all of the validation inputs have been added to the training set.

Once trained, the networks of some embodiments can be compiled into a set of program instructions for a machine-trained network inference circuit that implements such networks using real-world inputs. Such a machine-trained network inference circuit of some embodiments can be embedded into various different types of devices in order to perform different purposes (e.g., face recognition, object categorization, voice analysis, etc.). For each type of device, a network is trained, and the network parameters are stored with the neural network inference circuit to be executed on the device. These devices can include mobile devices, desktop computers, Internet of Things (IoT devices), etc.

Figure 11:
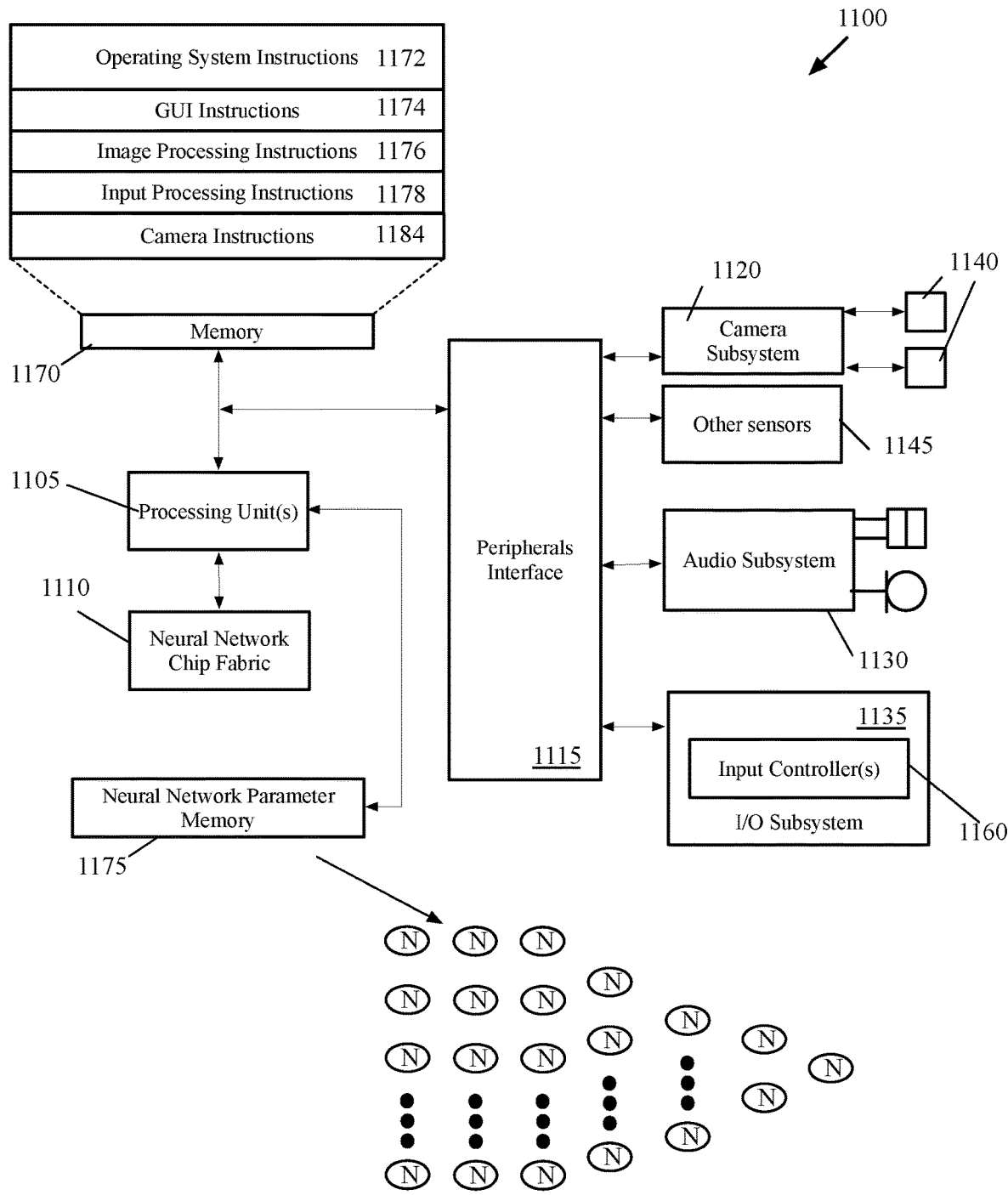
FIG. 11 illustrates an example of the architecture of a mobile computing device that stores neural network processing instructions.

FIG. 11 is an example of an architecture 1100 of an electronic device that includes a neural network integrated circuit of some embodiments. The electronic device may be a mobile computing device such as a smartphone, tablet, laptop, etc., or may be another type of device (e.g., an IoT device, a personal home assistant). As shown, the device 1100 includes one or more general-purpose processing units 1105, a neural network chip fabric 1110, and a peripherals interface 1115.

The peripherals interface 1115 is coupled to various sensors and subsystems, including a camera subsystem 1120, an audio subsystem 1130, an I/O subsystem 1135, and other sensors 1145 (e.g., motion/acceleration sensors), etc. The peripherals interface 1115 enables communication between the processing units 1105 and various peripherals. For example, an orientation sensor (e.g., a gyroscope) and an acceleration sensor (e.g., an accelerometer) can be coupled to the peripherals interface 1115 to facilitate orientation and acceleration functions. The camera subsystem 1120 is coupled to one or more optical sensors 1140 (e.g., charged coupled device (CCD) optical sensors, complementary metal-oxide-semiconductor (CMOS) optical sensors, etc.). The camera subsystem 1120 and the optical sensors 1140 facilitate camera functions, such as image and/or video data capturing.

The audio subsystem 1130 couples with a speaker to output audio (e.g., to output voice navigation instructions). Additionally, the audio subsystem 1130 is coupled to a microphone to facilitate voice-enabled functions, such as voice recognition, digital recording, etc. The I/O subsystem 1135 involves the transfer between input/output peripheral devices, such as a display, a touch screen, etc., and the data bus of the processing units 1105 through the peripherals interface 1115. The I/O subsystem 1135 includes various input controllers 1160 to facilitate the transfer between input/output peripheral devices and the data bus of the processing units 1105. These input controllers 1160 couple to various input/control devices, such as one or more buttons, a touch-screen, etc.

In some embodiments, the device includes a wireless communication subsystem (not shown in FIG. 11) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 11, a memory 1170 (or set of various physical storages) stores an operating system (OS) 1172. The OS 1172 includes instructions for handling basic system services and for performing hardware dependent tasks. The memory 1170 also stores various sets of instructions, including (1) graphical user interface instructions 1174 to facilitate graphic user interface processing; (2) image processing instructions 1176 to facilitate image-related processing and functions; (3) input processing instructions 1178 to facilitate input-related (e.g., touch input) processes and functions; and (4) camera instructions 1184 to facilitate camera-related processes and functions. The processing units 1105 execute the instructions stored in the memory 1170 in some embodiments.

The memory 1170 may represent multiple different storages available on the device 1100. In some embodiments, the memory 1170 includes volatile memory (e.g., high-speed random access memory), non-volatile memory (e.g., flash memory), a combination of volatile and non-volatile memory, and/or any other type of memory.

The instructions described above are merely exemplary and the memory 1170 includes additional and/or other instructions in some embodiments. For instance, the memory for a smartphone may include phone instructions to facilitate phone-related processes and functions. An IoT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 1175 stores the weight values, bias parameters, etc. for implementing one or more machine-trained networks by the neural network chip fabric 1110. In some embodiments, different clusters of the fabric 1110 can implement different machine-trained networks in parallel in some embodiments. In different embodiments, these neural network parameters are stored on-chip (i.e., in memory that is part of the neural network chip fabric 1110) or loaded onto neural network chip fabric 1110 from the neural network parameter memory 1175 via the processing unit(s) 1105.

While the components illustrated in FIG. 11 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 1105 and the neural network chip fabric 1110, which enables the processing units 1105 to provide inputs to the neural network chip fabric 1110 and receive the outputs of the network from the neural network chip fabric 1110. Also, while many of the functions have been described as being performed by one component, one of ordinary skill in the art will realize that the functions described with respect to FIG. 11 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
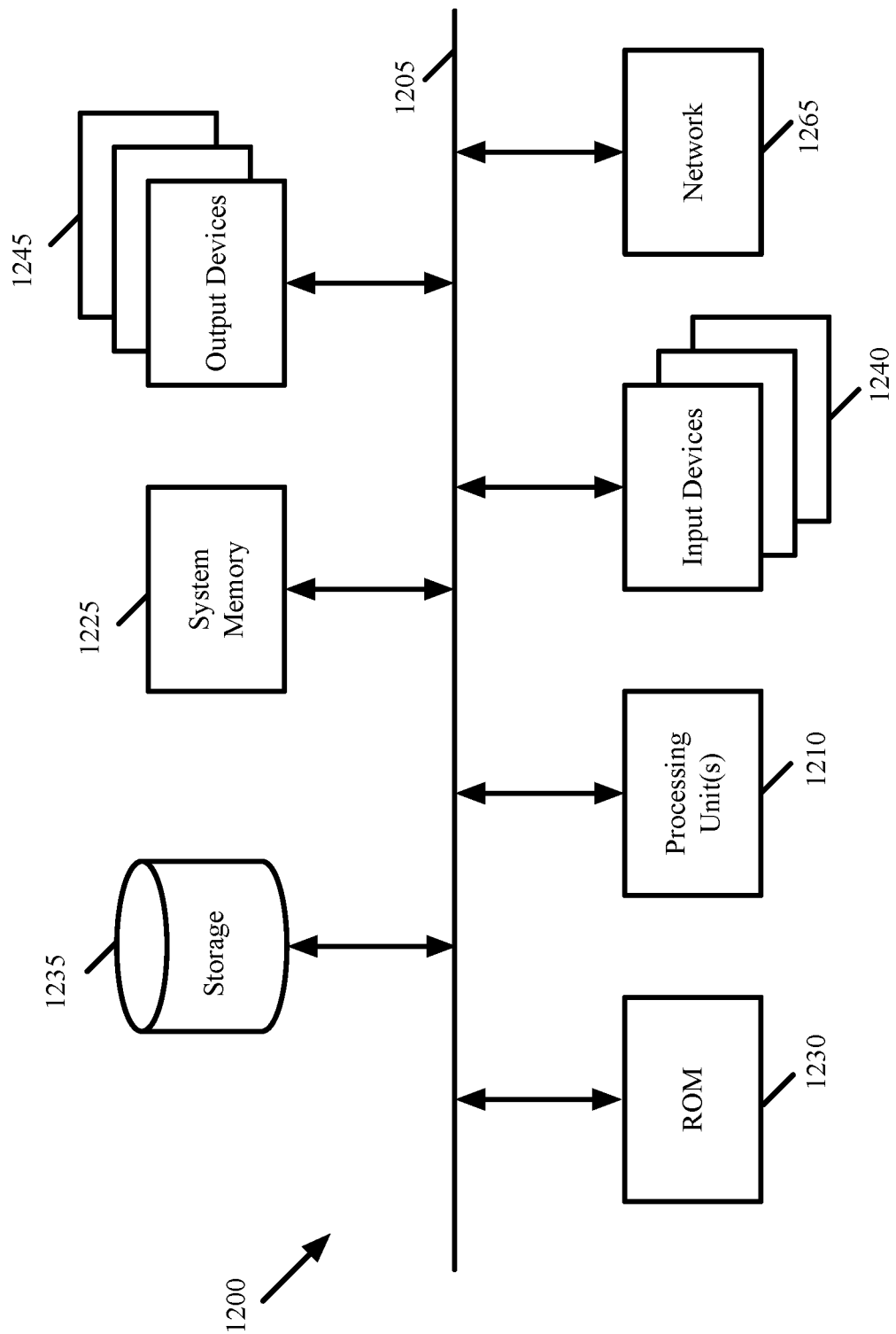
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the applications (e.g., the training application) described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieves instructions to execute and data to process in order to execute the processes of the invention. The processing unit(s) may be a single processor or a multi-core processor in different embodiments, and may include generic CPUs as well as graphics processing units (GPUs).

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random-access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 4, 7, and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for training a machine-trained network comprising a plurality of parameters, the method comprising:
propagating a batch of input training items through the network to generate output values and compute values of a loss function for each of the input training items;
computing a weight for each input training item based on the computed loss function values for each of the input training items; and
selecting input training items with larger weights more often than input training items with smaller weights for subsequent batches of input training items.

2. The method of claim 1, wherein:
each input training item has a corresponding expected output value; and
computing a value of a loss function for a particular input training item comprises comparing the corresponding expected output value to the generated output value for the input training item.

3. The method of claim 2, wherein the loss function values for the particular input training item increases as a distance between the corresponding expected output value and the generated output value for the input training item increases.

4. The method of claim 2, wherein the loss function is a measure of unhappiness.

5. The method of claim 1, wherein the weights for the input training items are proportional to the computed loss function values for the input training items.

6. The method of claim 1, wherein:
the input training items are selected from a plurality of available input training items; and
a number of available input training items is larger than a number of input training items in each batch of input training items.

7. The method of claim 6, wherein each input training item is selected at most once per batch of input training items.

8. The method of claim 6, wherein each input training item is selected at least once in the subsequent batches of input training items.

9. The method of claim 1, wherein:
the network is trained for classifying items into a predefined set of classes; and
the generated output value for a particular input training item comprises, for each class, a probability that the particular input training item belongs to the class.

10. The method of claim 1, wherein selecting input training items with larger weights more often enables the parameters of the machine-trained network to converge more quickly to optimal values.

11. A non-transitory machine-readable medium storing a program which when executed by at least one processing unit trains a machine-trained network comprising a plurality of parameters, the program comprising sets of instructions for:
propagating a batch of input training items through the network to generate output values and compute values of a loss function for each of the input training items;
computing a weight for each input training item based on the computed loss function values for each of the input training items; and
selecting input training items with larger weights more often than input training items with smaller weights for subsequent batches of input training items.

12. The non-transitory machine-readable medium of claim 11, wherein:
each input training item has a corresponding expected output value; and
the set of instructions for computing a value of a loss function for a particular input training item comprises a set of instructions for comparing the corresponding expected output value to the generated output value for the input training item.

13. The non-transitory machine-readable medium of claim 12, wherein the loss function values for the particular input training item increases as a distance between the corresponding expected output value and the generated output value for the input training item increases.

14. The non-transitory machine-readable medium of claim 12, wherein the loss function is a measure of unhappiness.

15. The non-transitory machine-readable medium of claim 11, wherein the weights for the input training items are proportional to the computed loss function values for the input training items.

16. The non-transitory machine-readable medium of claim 11, wherein:
the input training items are selected from a plurality of available input training items; and
a number of available input training items is larger than a number of input training items in each batch of input training items.

17. The non-transitory machine-readable medium of claim 16, wherein each input training item is selected at most once per batch of input training items.

18. The non-transitory machine-readable medium of claim 16, wherein each input training item is selected at least once in the subsequent batches of input training items.

19. The non-transitory machine-readable medium of claim 11, wherein:
the network is trained for classifying items into a predefined set of classes; and
the generated output value for a particular input training item comprises, for each class, a probability that the particular input training item belongs to the class.

20. The non-transitory machine-readable medium of claim 11, wherein the selection of input training items with larger weights more often enables the parameters of the machine-trained network to converge more quickly to optimal values.

* * * * *